United States Patent
Nag et al.

(10) Patent No.: US 11,429,558 B2
(45) Date of Patent: Aug. 30, 2022

(54) MAPPING TESTS OF SPREADSHEETS IN SERVER-BROWSER ENVIRONMENTS

(71) Applicant: DealVector, Inc., Sausalito, CA (US)

(72) Inventors: Subhrojit Nag, Pune (IN); Manish Kumawat, Jaipur (IN)

(73) Assignee: DealVector, Inc., Sausalito, CA (US)

( * ) Notice: Subject to any disclaimer, the term of this patent is extended or adjusted under 35 U.S.C. 154(b) by 0 days.

(21) Appl. No.: 17/228,378

(22) Filed: Apr. 12, 2021

(65) Prior Publication Data

US 2021/0232537 A1 Jul. 29, 2021

Related U.S. Application Data

(63) Continuation-in-part of application No. 17/202,663, filed on Mar. 16, 2021, now Pat. No. 11,327,926, (Continued)

(51) Int. Cl.
*G06F 17/00* (2019.01)
*G06F 16/11* (2019.01)
(Continued)

(52) U.S. Cl.
CPC .......... *G06F 16/122* (2019.01); *G06F 16/168* (2019.01); *G06F 16/1794* (2019.01); *G06F 16/2365* (2019.01)

(58) Field of Classification Search
CPC .. G06F 16/122; G06F 16/168; G06F 16/1794; G06F 16/2365; G06F 40/30; G06F 40/18
See application file for complete search history.

(56) References Cited

U.S. PATENT DOCUMENTS

| 5,983,268 A | 11/1999 | Freivald et al. |
| 6,592,626 B1 | 7/2003 | Bauchot et al. |
| (Continued) | | |

FOREIGN PATENT DOCUMENTS

| CA | 3013322 A1 | 8/2017 |
| EP | 1669905 A2 | 6/2006 |
| WO | WO 2011/130228 A2 | 10/2011 |

OTHER PUBLICATIONS

Vanhanen, J., et al, "Combining Data From Existing Company Data Sources: Architecture and Experiences", Proceedings of the 33rd Annual Hawaii International Conference on System Sciences, vol. 1, DOI: 10.1109/HICSS.2000.926901, pp. 1-6, Jan. 1, 2000 . (Year: 2000).*

(Continued)

*Primary Examiner* — Laurie A Ries
(74) *Attorney, Agent, or Firm* — Fenwick & West LLP

(57) ABSTRACT

A file management system may include a file server that performs calculations of a spreadsheet file instance to generate a dataset that includes values in the spreadsheet file instance. The file management system also may include an application operating at a client device that is in communication with the file server via a network. The application may receive, via the network, a version of the dataset comprising the values generated by the calculations performed by the server. The application may visualize a spreadsheet at the user interface. The visualized spreadsheet may display at least a subset of the values. In one case, protected contents of one or more cells in the spreadsheet may be converted to other values when displayed at the user interface.

20 Claims, 21 Drawing Sheets

Related U.S. Application Data which is a continuation of application No. 16/599,056, filed on Oct. 10, 2019, now Pat. No. 10,977,211.

(60) Provisional application No. 62/744,580, filed on Oct. 11, 2018.

(51) Int. Cl.
*G06F 16/16* (2019.01)
*G06F 16/23* (2019.01)
*G06F 16/178* (2019.01)

(56) References Cited

U.S. PATENT DOCUMENTS

| | | | |
|---|---|---|---|
| 7,099,890 B2 | 8/2006 | Cahill et al. | |
| 7,231,593 B1* | 6/2007 | Raja | G06F 40/151 |
| | | | 715/209 |
| 7,275,207 B2 | 9/2007 | Aureglia et al. | |
| 7,840,903 B1 | 11/2010 | Amidon et al. | |
| 8,473,396 B2* | 6/2013 | Hausman | G06Q 40/06 |
| | | | 705/36 R |
| 8,788,928 B2 | 7/2014 | McColl et al. | |
| 9,384,182 B2* | 7/2016 | Dorman | G06F 40/18 |
| 9,959,098 B1 | 5/2018 | Smith Devine | |
| 10,503,822 B1 | 12/2019 | Spencer et al. | |
| 2003/0088586 A1 | 5/2003 | Fitzpatrick et al. | |
| 2006/0048044 A1* | 3/2006 | Genesereth | G06F 40/18 |
| | | | 715/213 |
| 2007/0050416 A1 | 3/2007 | Battagin et al. | |
| 2007/0061698 A1 | 3/2007 | Megiddo et al. | |
| 2007/0277090 A1* | 11/2007 | Raja | G06F 40/151 |
| | | | 715/212 |
| 2008/0034281 A1* | 2/2008 | Handsaker | G06F 40/18 |
| | | | 715/219 |
| 2008/0222508 A1 | 9/2008 | Nguyen et al. | |
| 2008/0222509 A1 | 9/2008 | Nguyen et al. | |
| 2009/0235087 A1 | 9/2009 | Bird | |
| 2011/0016379 A1 | 1/2011 | McColl et al. | |
| 2011/0173676 A1 | 7/2011 | Peckover | |
| 2013/0019104 A1 | 1/2013 | Halas et al. | |
| 2013/0073937 A1 | 3/2013 | Fernandes et al. | |
| 2013/0073938 A1 | 3/2013 | Fernandes et al. | |
| 2013/0124478 A1* | 5/2013 | Ginzburg | G06F 40/18 |
| | | | 707/639 |
| 2013/0290822 A1* | 10/2013 | Chen | G06F 40/183 |
| | | | 715/212 |
| 2017/0098008 A1 | 4/2017 | Kemmer | |
| 2018/0276401 A1 | 9/2018 | Allen | |
| 2019/0187962 A1 | 6/2019 | Stachura | |
| 2019/0294659 A1* | 9/2019 | Sethi | G06Q 10/101 |
| 2019/0370322 A1* | 12/2019 | Miller, III | G06F 40/18 |
| 2020/0034415 A1* | 1/2020 | Gordon | G06F 40/18 |

OTHER PUBLICATIONS

PCT International Search Report and Written Opinion, PCT Application No. PCT/US19/55729, dated Jan. 10, 2020, 16 pages.
European Patent Office, Extended European Search Report, European Patent Application No. 19871851.2, dated Jun. 24, 2022, eight pages.

\* cited by examiner

FIG. 4

430 (Tab DA):

| | A | B |
|---|---|---|
| 1 | Field 1 | |
| 2 | Field 2 | |
| 3 | Field 3 | |
| 4 | | |
| 5 | | |
| 6 | | |
| 7 | | 432 |
| 8 | | |
| 9 | | |
| 10 | | |

420:

Buttons: Save | Select a Previous Mapping | Select an Action | Calculate | Toggle Checksum

| Source | | | Destination | | |
|---|---|---|---|---|---|
| Field Name | Name Location | Value Location | Expected Vector | Field Name | Name Location | Value Location |

— Mapping Entry 1
— Mapping Entry 2
— Mapping Entry 3
— Mapping Entry 4

422

Buttons: Apply Vector | Undo Vector | Show Mapping | Download | Upload

410 (Tab SA):

| | A | B |
|---|---|---|
| 1 | Time | |
| 2 | Account | Value B1 |
| 3 | Name | Value B2 |
| | | Value B3 |
| 4 | | |
| 5 | | |
| 6 | | 412 |
| 7 | | |
| 8 | | |
| 9 | | |
| 10 | | |

Tab DA (430):

| | A | B |
|---|---|---|
| 1 | | |
| 2 | Field 1 | |
| 3 | Field 2 | |
| 4 | Field 3 | |
| 5 | | |
| 6 | | |
| 7 | | |
| 8 | | |
| 9 | | |
| 10 | | 432 |

Mapping panel (420, 422):

Buttons: Save | Select a Previous Mapping | Select an Action | Calculate | Toggle Checksum

| Source | | | | Destination | | |
|---|---|---|---|---|---|---|
| Field Name | Name Location | Value Location | Expected Vector | Field Name | Name Location | Value Location |

Buttons: Apply Vector | Undo Vector | Show Mapping | Download | Upload

Tab SA (410):

| | A | B |
|---|---|---|
| 1 | Time | Value 1 |
| 2 | Account | Value 2 |
| 3 | Name | Value 3 — 510 |
| 4 | | |
| 5 | | |
| 6 | | |
| 7 | | 412 |
| 8 | | |
| 9 | | |
| 10 | | |

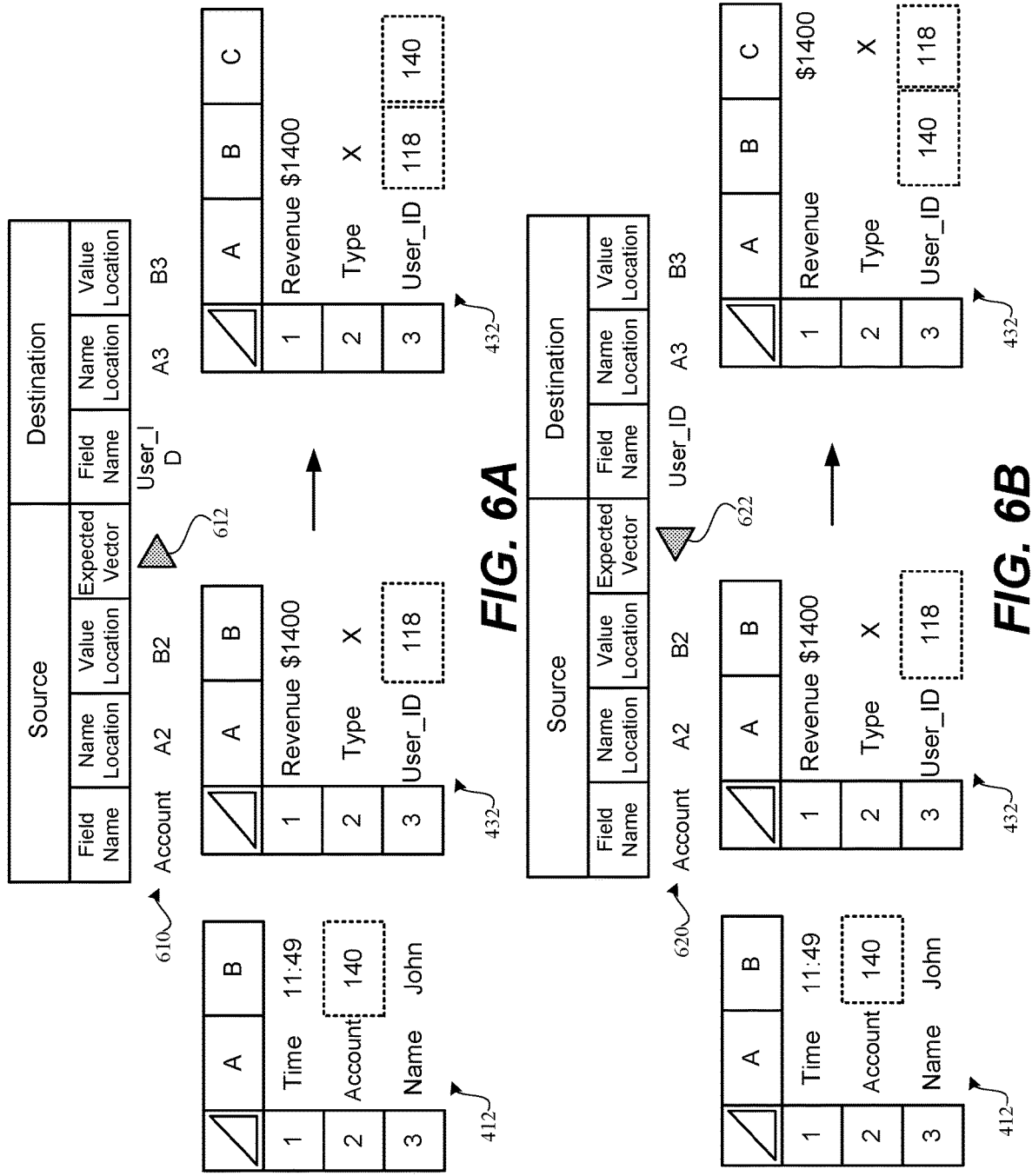

| / | A | B |
|---|---|---|
| 1 | Field1 | 80 |
| 2 | Field2 | 70 |
| 3 | Field3 | 40 |
| 4 | Total | 190 |
| 5 | Unrelated Field | 100 |
| 6 | | |
| 7 | | |

Source 412

| / | A | B |
|---|---|---|
| 1 | Field1 | 20 |
| 2 | Field2 | 40 |
| 3 | Field3 | 70 |
| 4 | Total | 130 |
| 5 | | |
| 6 | | |
| 7 | | |

Destination 432

| / | A | B | C |
|---|---|---|---|
| 1 | Field1 | 20 | 80 |
| 2 | Field2 | 40 | 70 |
| 3 | Field3 | 70 | 40 |
| 4 | Total | 130 | 190 |
| 5 | | | |
| 6 | | | |
| 7 | | | |

Destination 432

*FIG. 8*

| Debt Capital Structure | | |
|---|---|---|
| | Class A | Class B |
| Total Beginning | 771.20 | 114.60 |
| Total Last Period | 571.20 | 88.79 |
| Ratio | 64.67% | 75.76% |
| Length to Time 1 | 7.70 | 7.11 |
| Length to Time 2 | 4.42 | 4.42 |
| Compensation Promised | 4.125% | 5.700% |

| Equity Pricing | |
|---|---|
| Total Senior ($mm) | 897.82 |
| Total Junior ($mm) | 208.00 |
| Underlying ($mm) | 1,101.82 |
| Yield 1 | 11.92% |
| Yeild 2 | 11.77% |
| Yield 3 | 7.12% |

| Scenarios | |
|---|---|
| Cases | Pricing Case |
| Sale Scenario | ReFi at ARD |

| Expenses | |
|---|---|
| Fee 1 | 3.25% |
| Fee 2 | 1.25% |
| Fee 3 | 3.1% |
| Fee 4 | 4.5% |

| Portfolio Stress | |
|---|---|
| Sheet 1 | 0.00% |
| Sheet 2 | 0.00% |
| Sheet 3 | 0.00% |

FIG. 11A

Assumptions

| | |
|---|---|
| Select Variable 1 | Avg of 3 Appraisals |
| Pct vs Reference 1 | 8% |
| Pct vs Reference 2 | 4% |
| Fee as % of Stream 1 | 3.50% |
| Fee as % of Stream 2 | 1.50% |
| Incentive 1 | 40% |
| Incentive 2 | 40% |
| Residue Fee 1 | 10.0% |
| Residue Fee 2 | 0.10% |
| Residue Fee 3 | 99.5% |
| Operating Costs | Nomin |
| Value Adjustment | 1.00% |
| Revenue 1 | 0.0% |
| Revenue Type | Renewal Only |
| Final Discount | 1.50% |
| Type of Analysis | Market Standard |
| Date | Sep-25 |

FIG. 11B

< Back To Models          View Model

Model AAA |v

REPORTS

VERSION CONTROL

UPDATE

DOCUMENTS

SETTINGS ʌ

INPUTS CONDITION

LANDING PAGE

HELP IMAGES

COMPARISON RANGES

UNROUNDED RANGES

AUTO CALCULATE RANGES

CONFIGURATION

PRICING

RANGES

STRESSORS

FEATURES

STANDARD DASHBOARD

PERMISSIONS ʌ

RANGES | Mappings

EXPORT    IMPORT

| Sheet ⇅ | Cell ⇅ | Formula ⇅ | Source Sheet ⇅ | Source Cell ⇅ | |
|---|---|---|---|---|---|
| Select to filter v | Search 22 | Search 2208 records | Select to filter | Search 2208 rec | |
| Standard Dashboard | H7 | =Dashboard!$AR$18 | Dashboard | AR18 | ✎🗑 |
| Standard Dashboard | I7 | =Dashboard!$AT$18 | Dashboard | AT18 | ✎🗑 |
| Analysis Ref | D5 | =Dashboard!B40 | Dashboard | B40 | ✎🗑 |
| Analysis Ref | D6 | =Dashboard!B41 | Dashboard | B41 | ✎🗑 |
| Analysis Ref | D7 | =Dashboard!B42 | Dashboard | B42 | ✎🗑 |
| Analysis Ref | D8 | =Dashboard!B43 | Dashboard | B43 | ✎🗑 |
| Analysis Ref | D9 | =Dashboard!B44 | Dashboard | B44 | ✎🗑 |
| Analysis Ref | D10 | =Dashboard!B45 | Dashboard | B45 | ✎🗑 |
| Analysis Ref | D11 | =Dashboard!B46 | Dashboard | B46 | ✎🗑 |
| Analysis Ref | D12 | =Dashboard!B47 | Dashboard | B47 | ✎🗑 |
| Analysis Ref | D13 | =Dashboard!B48 | Dashboard | B48 | ✎🗑 |
| Analysis Ref | D14 | =Dashboard!B49 | Dashboard | B49 | ✎🗑 |
| Analysis Ref | D15 | =Dashboard!B50 | Dashboard | B50 | ✎🗑 |

FIG. 11C

| E12 | | | Model AAA |
|---|---|---|---|
| Valuation date | 15-Feb-21 | | |

| Consultants | | Include | |
|---|---|---|---|
| Consultant 1 | | Average of 3 Appraisers | Use for: |
| Consultant 2 | | Yes | Dispositions and Leases |
| Consultant 3 | | Yes | Dispositions and Leases |
| Consultant 4 | | Yes | Dispositions and Leases |
| Consultant 5 | (Benchmark) | Yes | Dispositions and Leases |

| Scenarios | | | |
|---|---|---|---|
| Scenario 1 | | Refi at ARD | |
| Scenario 2 | | 15-Sep-25 | |
| Scenario 3 | | Pricing Case | |
| Scenario 4 | | Base/Mgmt | |

| Stressors | | Premium/(Discount) | Assert Level stressing done in Fleet Analysis Tab |
|---|---|---|---|
| Income 1 | | 0.00% | Aggregate Level |
| Income 2 | | 0.00% | Aggregate Level |
| Income 3 | | 0.00% | Aggregate Level |
| | | | |
| Type 2 Income 1 | | 0.00% | Aggregate Level |
| Type 2 Income 2 | | 0.00% | Aggregate Level |
| Type 2 Income 3 | | 0.00% | Aggregate Level |
| | | | |
| Type 2 Expense 1 | | 0.00% | Aggregate Level |
| Type 2 Expense 2 | | 0.00% | Aggregate Level |
| Type 2 Expense 3 | | 0.00% | Aggregate Level |
| | | | |
| End Point 1 | | 0.00% | Aggregate Level |
| End Point 2 | | N/A | Aggregate Level |
| End Point 3 | | N/A | Aggregate Level |
| | | | |
| Residual Value | | 6.5% | Aggregate Level |

FIG. 11D

| E12 | | | |
|---|---|---|---|
| Valuation date | 15-Jan-21 | | |
| Consultants | | Include | |
| | Average of 3 Appraisers | Use for: | |
| Consultant 1 | Yes | Dispositions and Leases | |
| Consultant 2 | Yes | Dispositions and Leases | |
| Consultant 3 | Yes | Dispositions and Leases | |
| Consultant 4 | Yes | Dispositions and Leases | |
| Consultant 5 | | | |
| Scenario 1 | Refi at ARD | | |
| Scenario 2 | 15-Sep-25 | | |
| Scenario 3 | Pricing Case | | |
| Scenario 4 | Base/Mgmt | | |
| Stressors | Premium/(Discount) | Assert Level stressing done in Fleet Analysis Tab | |
| Income 1 | 0.00% | Aggregate Level | |
| Income 2 | 0.00% | Aggregate Level | |
| Income 3 | 0.00% | Aggregate Level | |
| Type 2 Income 1 | 0.00% | Aggregate Level | |
| Type 2 Income 2 | 0.00% | Aggregate Level | |
| Type 2 Income 3 | 0.00% | Aggregate Level | |
| Type 2 Expense 1 | 0.00% | Aggregate Level | |
| Type 2 Expense 2 | 0.00% | Aggregate Level | |
| Type 2 Expense 3 | 0.00% | Aggregate Level | |
| End Point 1 | 0.00% | Aggregate Level | |
| End Point 2 | N/A | Aggregate Level | |
| End Point 3 | N/A | Aggregate Level | |
| Residual Value | 6.5% | Aggregate Level | |

Exclude EOL

Model AAA    FEB'21    400 X

Manage Scenarios    X

Saved Scenarios (+) Base 400
(+) Base Case 150
(+) Base Case 300

CREATE SCENARIO   TEMPLATE   CLOSE

*FIG. 11E*

| | February 16, 2021 | PRICE ∨ | 100.00 |
|---|---|---|---|

| Class A X | | | |
|---|---|---|---|
| Base 400 X | Base Case 150 X | | |

| | Base 400 | Base Case 150 |
|---|---|---|
| PRICE | 100.000 | 100.000 |
| BEY | 4.1709% | 4.1709% |
| XIRR | 4.2073% | 4.2073% |
| MOD DUR | 2.984 | 2.984 |
| WAL | 3.291 | 3.291 |
| TERMINAL UNPAID PRINCIPAL BALANCE | 0.00 | 0.00 |
| CURR FACE * PX | 531.20 | 531.20 |
| ACCRUED (WHOLE TR) | 0.0 | 0.0 |
| TOTAL PROCEEDS | 531.20 | 531.20 |
| YTWC | 2022-01-17 | 2022-01-17 |
| WC XIRR | 4.1892% | 4.1892% |
| WC BEY | 4.1531% | 4.1531% |
| WC MOD DUR | 0.835 | 0.835 |
| WC WAL | 1.005 | 1.005 |

☐ Send calculated results to mail

CALCULATE ALL

*FIG. 11F*

|   | A | B | C | D | E |
|---|---|---|---|---|---|
| 1 | Sheet | Cell | Original Value | Augmented Value | Delta |
| 2 | Portfolio Fleet Plan | AV4 | 174 | | 110 |
| 3 | Portfolio Fleet Plan | AV5 | 252 | 64 | 188 |
| 4 | Portfolio Fleet Plan | AV6 | 186 | 64 | 122 |
| 5 | Portfolio Fleet Plan | AV7 | 195 | 64 | 131 |
| 6 | Portfolio Fleet Plan | AV8 | 195 | 64 | 131 |
| 7 | Portfolio Fleet Plan | AV9 | 149 | 64 | 85 |
| 8 | Portfolio Fleet Plan | AV10 | 185 | 64 | 121 |
| 9 | Portfolio Fleet Plan | AV11 | 243 | 64 | 179 |
| 10 | Portfolio Fleet Plan | AV12 | 241 | 64 | 177 |
| 11 | Portfolio Fleet Plan | AV13 | 234 | 64 | 170 |
| 12 | Portfolio Fleet Plan | AV14 | 134 | 64 | 70 |
| 13 | Portfolio Fleet Plan | AV15 | 122 | 64 | 58 |
| 14 | Portfolio Fleet Plan | AV16 | 118 | 64 | 54 |
| 15 | Portfolio Fleet Plan | AV17 | 174 | 64 | 110 |
| 16 | Portfolio Fleet Plan | AV18 | 253 | 64 | 189 |
| 17 | Waterfall | NU8 | 1 | 0.855670688 | 0.144329312 |

*FIG. 12*

MAPPING TESTS OF SPREADSHEETS IN SERVER-BROWSER ENVIRONMENTS

CROSS-REFERENCE TO RELATED APPLICATIONS

The present application is a continuation in part of U.S. patent application Ser. No. 17/202,663, filed on Mar. 16, 2021, which is a continuation of U.S. patent application Ser. No. 16/599,056, filed on Oct. 10, 2019, which claims the benefit of U.S. Provisional Patent Application No. 62/744,580 filed on Oct. 11, 2018. All of which are hereby incorporated by reference in their entirety.

TECHNICAL FIELD

The disclosed embodiments are related to generating and processing spreadsheets and, more particularly, related to providing a file server that may perform calculations of the spreadsheet and a user interface that may render a visualization of the spreadsheet.

BACKGROUND

Native desktop spreadsheets, such as those files that are run locally on a computer, are often the "workhorse" tools used for data modeling. They are widely used, flexible in adapting to a myriad of cases, powerful in the sense that they can handle large and complex applications, and rapidly deployable. Yet, against these significant advantages are several limitations. Native desktop spreadsheets are often complex files that are generally slow to load at launch. They are often hackable. For example, contents in a native desktop spreadsheet file are often fully transparent to expert users. Moreover, distribution of spreadsheets is problematic especially because the creation of multiple file copies may introduce problems of version control during development or continued usage of the spreadsheet. Also, it is often very difficult to track who has used a native desktop file once the file is passed from the control of its owner.

BRIEF DESCRIPTION OF THE DRAWINGS

Figure (FIG. 1 is a block diagram illustrating an environment of an example file management system, in accordance with an embodiment.

FIG. 4 illustrates an example graphical user interface (GUI), in accordance with an embodiment.

FIGS. 5A, 5B, 5C, and 5D are conceptual diagram illustrating an example process in creating a mapping entry in a mapping file, in accordance with an embodiment.

FIGS. 6A and 6B are conceptual diagrams illustrating update processes of destination files based on the mapping entries in mapping files, in accordance with an embodiment.

FIG. 8 is a conceptual diagram illustrating an example use of a checksum feature, in accordance with an embodiment.

FIG. 11A and FIG. 11B are conceptual diagrams illustrating two spreadsheets that have different looks, feels, and arrangements of data, in accordance with some embodiments.

FIG. 11C is a conceptual diagram illustrating an example graphical user interface for a user to create and manage a mapping file that associates cells in a standard dashboard and one or more spreadsheets, in accordance with some embodiments.

FIG. 11D is a conceptual diagram illustrating an example standard dashboard, in accordance with some embodiments.

FIG. 11E is a conceptual diagram illustrating a functionality of the file server to provide sets of predetermined values to increase the speed of operation of the spreadsheet and adjustment, in accordance with an embodiment.

FIG. 11F is a conceptual diagram illustrating a GUI of the file server 120 that displays an analytical report that can be generated based on various spreadsheets with different arrangements of data, in accordance with some embodiments.

FIG. 12 is a conceptual diagram illustrating a mapping test report, in accordance with some embodiments.

Figure 1:
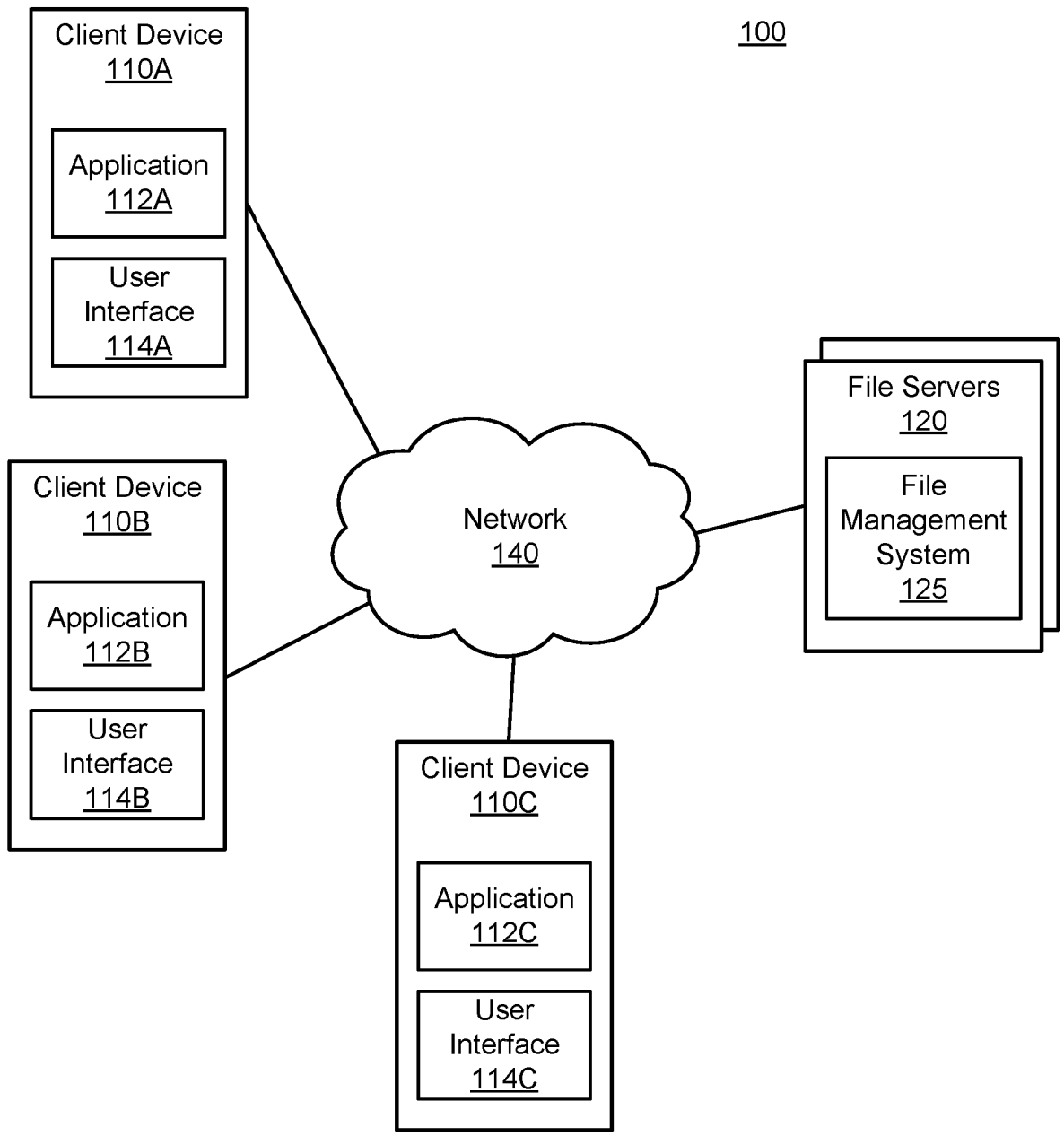

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed are example embodiments relating to file management systems and processes for efficiently calculating values of a file such as a spreadsheet and rendering the file on a user interface. In accordance with an embodiment, an example system may include a server and an application operating at a client device that is in communication with the server via a network. The server may perform calculations for a spreadsheet file instance to generate a dataset that includes values in the spreadsheet file instance. The server may convert protected contents of the spreadsheet file instance to other formats or values. For example, one or more formulas that are protected contents in the spreadsheet may be converted to other values before the dataset is transmitted to the client device. The system allows an edit to a spreadsheet to be reflected in two files that are saved in two platforms (e.g., the application of the client device and the server).

The application of the client device may receive, via the network, a version of the dataset that includes the converted contents and the values generated by the calculations performed by the server. The version of the dataset may be an encoded version for transmission over the network. The application may visualize the spreadsheet at a user interface. The visualized spreadsheet may display at least a subset of the values and display the converted contents instead of the protected contents. The application may create associations between the values and the cells of the spreadsheet and encode the values in document object model (DOM) elements. The application may detect a display area of the user interface and identify a subset of cells that are covered by the display area. The subset of values that are displayed may correspond to the cells that are covered by the display area.

Example System Environment

Referring now to FIG. (FIG. 1, a block diagram that illustrates an environment of an example file management system 100 is shown, in accordance with an embodiment. By way of example, the file management system 100 may include one or more client devices, e.g., 110A, 110B, 110C, etc. (collectively referred to as client devices 110 or a client device 110), one or more file servers 120, each having a file management system 125. In various embodiments, the system 100 may include fewer and additional components that are not shown in FIG. 1. The components in the system 100 may communicate through the network 140. The components in the system 100 may cooperate to provide various interfaces and system components to manage and operate various types of files, such as spreadsheets and webpage files. In this disclosure, while a file may be referred to as a spreadsheet, the operations described herein can be extended to other file formats, such as a webpage file in a markup language format or another suitable format (e.g., HTML file, XML file, JSON file etc.). The spreadsheets illustrated in various embodiments are merely examples of files.

A client device 110 may be controlled by a client of the server 120 who may send a request to store, read, search, delete, and/or modify data stored in one or more files such as spreadsheets. The client also may be referred to as a user or an end user of the server 120. The client device 110 also may be referred to as a user device or an end user device. Each client device 110 may include one or more applications 112 (individually referred to as 112A, 112B, 112C, etc., and collectively referred to as applications 112 or an application 112) and one or more user interfaces 114 (individually referred to as 114A, 114B, 114C, etc., and collectively referred to as user interfaces 114 or a user interface 114). The client devices 110 may be any computing devices. Examples of such client devices 110 include personal computers (PC), desktop computers, laptop computers, tablets (e.g., iPADS), smartphones, wearable electronic devices such as smartwatches, or any other suitable electronic devices. The clients may be of different natures such as including individual end users, organizations, businesses, and other clients that use different types of client devices that run on different operating systems.

The applications 112 may be any suitable software applications that operate at the client devices 110. An application 112 may be in communication with the file server 120 via the network 140. The application 112 may generate a visualization of a file such as a spreadsheet to be displayed at a user interface 114. The applications 112 may be of different types. In one case, an application 112 may be a web application that runs on JavaScript or other alternatives, such as TypeScript, etc. In the case of a web application, the application 112 cooperates with a web browser, which is an example of user interface 114, to render a spreadsheet. In another case, an application 112 may be a mobile application. For example, the mobile application may run on Swift for iOS and other APPLE operating systems or on Java or another suitable language for ANDROID systems. In yet another case, an application 112 may be a software program that operates on a desktop operating system such as LINUX, MICROSOFT WINDOWS, MAC OS, or CHROME OS.

In one embodiment, the applications 112 may be provided and controlled by the file server 120. For example, the company operating the file server 120 may be a cloud service provider that provides a front-end software application that can be installed, run, or displayed at a client device 110. For example, the company may provide the applications 112 as a form of software as a service (SaaS). In one case, an example application 112 is published and made available by the company operating the file server 120 at an application store (App store) of a mobile operating system. In another case, an end user may go to the company's website and launch a web application for the access and edit of the files such as spreadsheets.

The user interfaces 114 may be any suitable interfaces for receiving inputs from users and for communication with users. When a user of the client device 110 attempts to store, read, search, delete, or modify a file, the user may communicate to the application 112 and the file server 120 through the user interface 114. The user interface 114 may take different forms. In one embodiment, the user interface 114 may be a web browser such as CHROME, FIREFOX, SAFARI, INTERNET EXPLORER, EDGE, etc. and the application 112 may be a web application that is run by the web browser. In another application, the user interface 114 is part of the application 112. For example, the user interface 114 may be the front-end component of a mobile application or a desktop application. The user interface 114 also may be referred to as a graphical user interface (GUI) which includes graphical elements to display files such as spreadsheets. In another embodiment, the user interface 114 may not include graphical elements but may communicate with the file server 120 via other suitable ways such as application program interfaces (APIs).

The file servers 120 are one or more computing devices that manage and process files such as spreadsheets. In this disclosure, the file servers 120 may collectively and singularly be referred to as a file server 120, even though the file server 120 may include more than one computing devices. For example, the file server 120 may be a pool of computing devices that may be located at the same geographical location (e.g., a server room) or distributed geographically (e.g., cloud computing, distributed computing, or in a virtual server network). The file server 120 may include a file management system 125 that manages and processes files. The files may be saved in the data storage provided by the file server 120 or may be saved in a third-party storage system such as AMAZON AWS, DROPBOX, RACKSPACE CLOUD FILES, AZURE BLOB STORAGE, GOOGLE CLOUD STORAGE, etc. In some cases, the file server 120 also may be referred to as a cloud storage server 120.

Figure 13:
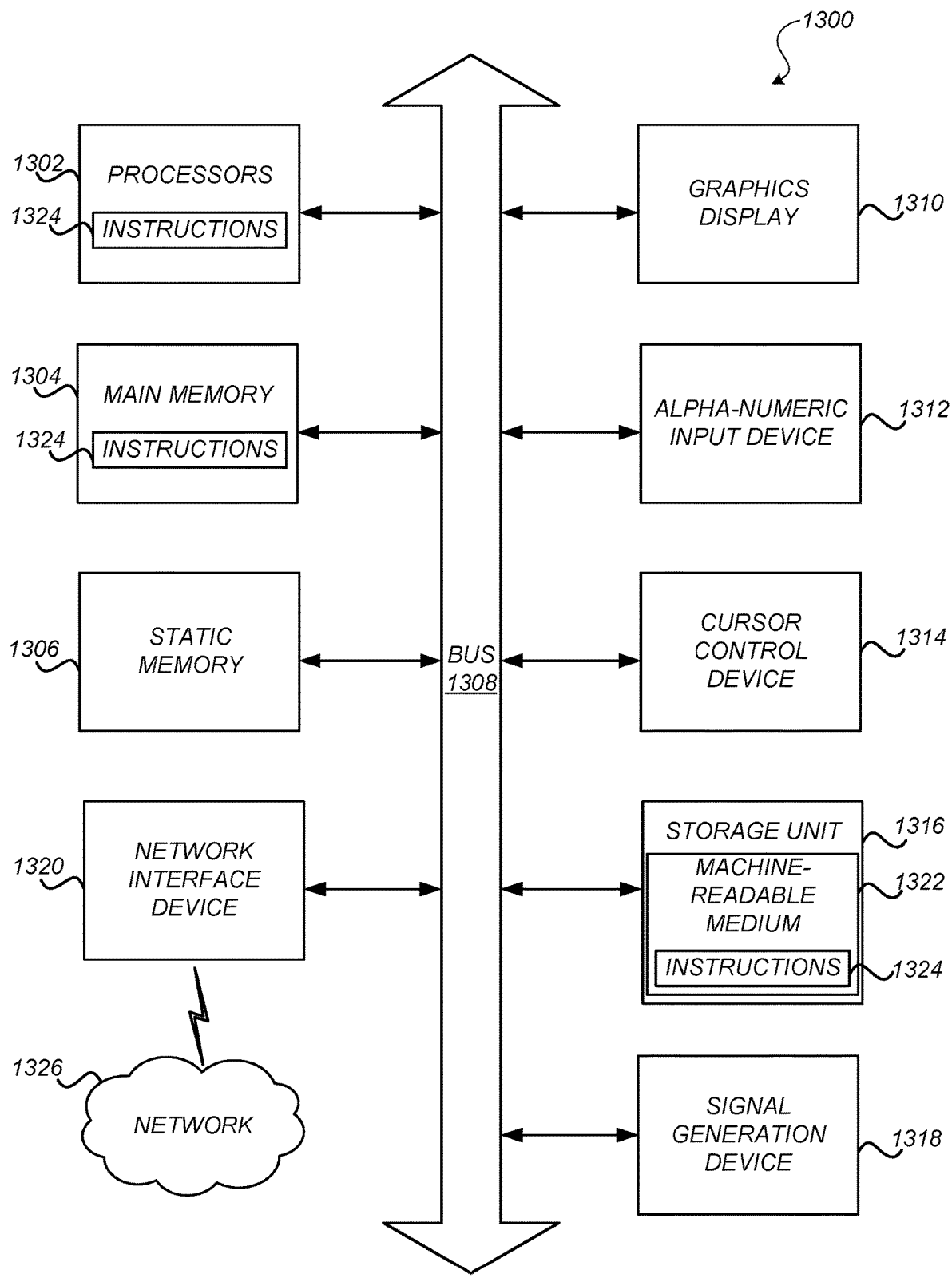
FIG. 13 is a block diagram of an example computing device, in accordance with an embodiment.

A computing device of the file server 120 may take the form of software, hardware, or a combination thereof (e.g., a computing machine of FIG. 13). For example, parts of the file server 120 may be a PC, a tablet PC, a smartphone, an internet of things (IoT) appliance, or any machine capable of executing instructions that specify actions to be taken by that machine. Parts of the server 120 may include one or more processing units (e.g., a central processing unit (CPU), a graphics processing unit (GPU), a digital signal processor (DSP), a controller, a state machine, one or more ASICs, one or more RFICs, or any combination of these) and a memory.

The file management system 125 may be a software system that performs calculations and processing of files such as spreadsheets to generate datasets that includes values in the files such as spreadsheets. In one embodiment, since the calculations and processing of files are performed on the server side, the processing capacity available to the file server 120 may be significantly higher than the processing capacity of a client device 110 or that of a web browser that is used as the user interface 114.

The communications between the client devices 110 and the server 120 may be transmitted via a network 140, for example, via the Internet. The network 140 provides connections to the components of the system 100 through one or more sub-networks, which may include any combination of local area and/or wide area networks, using both wired and/or wireless communication systems. In one embodiment, a network 140 uses standard communications technologies and/or protocols. For example, a network 140 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 140 may be represented using any suitable format, such as hypertext markup language (HTML), extensible markup language (XML), or JSON. In some embodiments, all or some of the communication links of a network 140 may be encrypted using any suitable technique or techniques such as secure sockets layer (SSL), transport layer security (TLS), virtual private networks (VPNs), Internet Protocol security (IPsec), etc. The network 140 also includes links and packet switching networks such as the Internet.

The system 100 allows an edit to be saved in two files (e.g., a visualized spreadsheet at the user interface 114 and a server-side spreadsheet at the file management system 125) that are distributed in two platforms (e.g., client device 110 and file server 120). Details of the client devices 110, applications 112, user interfaces 114, file server 120 and file management system 125 will be further discussed with reference with other figures such as FIGS. 2 and 3. The details will be discussed through examples of facilitating a deployment of spreadsheet functionality into a web browser environment, but the same or similar principles may be applied to other embodiments of this disclosure that use other file formats (e.g., files other than spreadsheet) in other types of applications 112 and user interfaces 114 (e.g., a mobile application that is independent of a web browser). The use of spreadsheet and web browser as example should not be construed as limiting the disclosure to only spreadsheets and web browsers.

Example File Server

Figure 2:
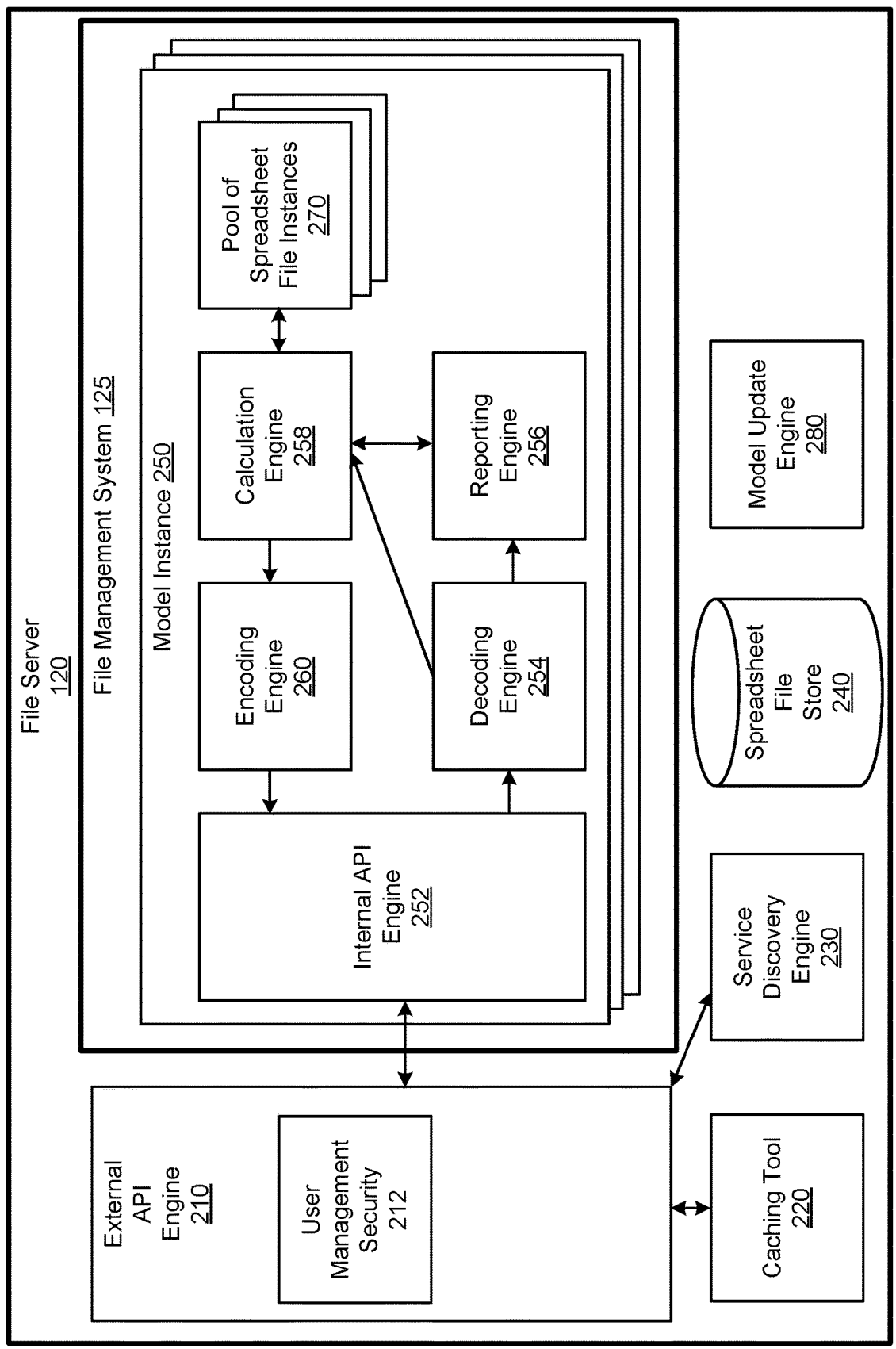
FIG. 2 is a block diagram illustrating an example file server, in accordance with an embodiment.

FIG. 2 is a block diagram illustrating an example file server 120, in accordance with an embodiment. Components of the file server 120 may include all or a subset of the example computing system illustrated and described with FIG. 13. The file server 120 may include the file management system 125, an external application programming interface (API) engine 210, a caching tool 220, a service discovery engine 230, a spreadsheet file store 240, and a model update engine 280. In various embodiments, the file server 120 may include fewer and additional components that are not shown in FIG. 2. The functions of the file server 120 may be distributed among the components in a different manner than described. The file server 120 performs calculations and other processing for various spreadsheet file instances. For each spreadsheet file instance, the file server 120 may generate a dataset that includes values in the spreadsheet file instance. For example, the values also may be referred to as contents, which includes numerical values, formulas, and rules in various cells of the spreadsheet file instance.

The file server 120 may store various spreadsheet files in the spreadsheet file store 240. Each spreadsheet file may be created by a user, which may be referred to as a creator or an owner. An owner may create a spreadsheet by uploading an existing spreadsheet file (e.g., a CSV file, an excel file, etc.) to the file server 120 or by building the spreadsheet file directly through the application (e.g., application 112) provided by the file server 120. An owner may also be a person who has been granted authorities by the original creator of the spreadsheet file. Hence, a spreadsheet file may include more than one owner. The spreadsheet files also may be referred to server-side spreadsheet files. A spreadsheet may include one or more worksheets (which may be represented in different tabs). Each worksheet may include rows and columns that define cells that are within one worksheet. Each worksheet may be a separate file and several worksheets combined in a spreadsheet may also be a file.

For a spreadsheet file, the file server 120 may store a pool of spreadsheet file instances 270. Each pool 270 may correspond to an originating file. For example, each spreadsheet file instance in the pool 270 may be a copy of the underlying spreadsheet file. When the originating spreadsheet file is first created, the file may be referred to as in a zero-state condition. A zero-state condition may include, for example, the state when an originating file is first uploaded, or a state when the file with various edits are combined and reconciled. For example, the file server 120 also may receive edits to one or more spreadsheet file instances in the pool 270 and occasionally apply the edits to the originating spreadsheet file. The edited file may be referred to as a new zero state. In other words, a zero state may be a common reference point among the spreadsheet file instances in the pool 270. In one embodiment in which the feature of having multiple copies of the same spreadsheet file is not implemented, a spreadsheet file instance may be the same as the spreadsheet file.

The file server 120 may use the file management system 125 to maintain a pool of spreadsheet file instances 270 for each spreadsheet file. For each spreadsheet file, the file management system 125 may create a model instance 250. Hence, the file management system 125 may maintain multiple model instances 250 for various spreadsheet files saved in the spreadsheet file store 240. Each model instance 250 deploys various components to manage and process a pool of spreadsheet file instances 270. The processing capacity available to file server 120 enables the full capabilities of spreadsheets compared to web browser based spreadsheets, which have limited capacities. Owing to the possibility of having a network of computing devices to form the file server 120 in various embodiments, the computing performance could exceed what would be available to those using native desktop spreadsheets files on less powerful computers. The pool of spreadsheet file instances 270 also allows multiple users (e.g., collaborators and the creator) to simultaneously access a model instance 250 without impediment to each other or loss of performance. The file server 120 may maintain distinct pools of the spreadsheet file. The distinct pools may exist on multiple computing devices and may be managed by service discovery engine 230, which distributes and assigns tasks to various computing devices in the file server 120 and keeps track of different spreadsheet file instances.

The file management system 125 may include one or more additional features. For example, between periods of engagement of a file instance by users, the file instances in the pool 270 may be maintained in a zero state and are maintained as opened by file management system 125. The zero-state condition may be the starting-point of the spreadsheet as observed by users when a spreadsheet is displayed at a user device 110. The file instances being maintained opened reduces the lag upon first using the file as the spreadsheet is called by a user interface 114 such as a web browser. The number of file instances deployed in a pool 270 may be increased according to information received from calculation engine 258, and may be scaled indefinitely based on the usage as indicated in the calculation engine 258. For example, the file management system 125 maintains a sufficient buffer of spreadsheet file instances that are unused but opened to service the demand anticipated. As the number of spreadsheet file instances that are being processed by the calculation engine 258 increases, additional zero-state spreadsheet file instances may be added in the pool 270. In one embodiment, the file management system 125 does not have an effective limit to the number of simultaneous users who may interact with a particular model instance 250.

The pool of spreadsheet file instances 270 also allows multiple users to collaborate simultaneously and allows the file server 120 to track changes individually. As multiple collaborators input data at the user interfaces 114 such as web browsers, file server 120 receives their inputs ultimately to edit the respective individual file instances at the zero state in the pool. The file server 120 records the edits of collaborators and compare the edits to the zero state. The file server 120 associates a spreadsheet file instance having an edit with a user identifier of the collaborator who made the edit so that the file server 120 may keep track of individual edits. The file server 120 transmits the resulting outputs back to the appropriate collaborators, and allows each collaborator to save particular scenario results to a non-zero state. The non-zero state for a particular spreadsheet file instance will be affiliated with the collaborator's user account. The file management system 125 as hosted by the file server 120 solves the technical challenges of slow loading times and multiple users. It also confers the benefits (not available to single native desktop instances of spreadsheets) of allowing for multi-party to track usage while maintaining version control and content protection.

The file server 120 may receive inputs from users via the network 140 and perform calculation and processing of spreadsheets using the file management system 125. The external API engine 210 may be the interface of the file server 120 for the receipt and transmission of data between user devices 110 and the file server 120. The external API engine 210 may include a user management security engine 212 that determines the user authority in editing a particular spreadsheet file instance and provides vetting for other user permissions and security before input data from a user is further transmitted to the internal API engine 252. The file server 120 also may use the service discovery engine 230 to determine how to route the input data to a particular model instance 250 and a particular computing device of the file server 120.

The internal API engine 252 may be an interface of a model instance 250 for communications with other components. In one embodiment, the internal API engine 252 transmits the dataset that includes the user's inputs to a decoding engine 254. The decoding engine 254 converts the dataset that is encoded in a format for the transmission through the network 140 to another format that is used by the file management system 125. The decoding engine 254 provides the decoded dataset to the calculation engine 258 to perform calculation and processing of the values in one of the spreadsheet file instances. For example, the dataset input from the user may include, at a cell of the spreadsheet, a new value or edited value that affects the generation of values in other cells. The calculation engine 258 performs calculations of other cells in the spreadsheet file instance based on the new or edited value. In another example, the dataset inputted from the user may specify a new formula or rule. The calculation engine 258 applies the formula or rule to one or more cells in the spreadsheet file instance that is associated with the user. The calculation engine 258 generates the values in the spreadsheet file instance. The calculation engine 258 may repeat the calculation for other spreadsheet file instances and also for other spreadsheets. The values of a single spreadsheet file instances may be provided as an output dataset or values from various spreadsheets may be combined as an output dataset for the encoding engine 260 to encode to a format used for transmission via the network 140. The encoding engine 260 may perform a content protection operation to change protected contents to other formats, which will be discussed further in detail with reference to encoding and decoding of data below. The output dataset is transmitted to a client device 110 for display via the internal API engine 252, the external API engine 254, and the network 140.

The file management system 125 also may include a report feature using the reporting engine 256. For example, for a spreadsheet that is created by an owner (e.g., a creator), the reporting engine 230 may record the activities of collaborators performed on one or more spreadsheet file instances in the pool 270. The report engine 230 may transmit a report that includes documentation of the activities of the collaborators to the owner. For example, the report may specify the kinds of edits that each collaborator made and provide options for the create to adopt the edits to generate another zero-state checkpoint and to reconcile or resolve the conflicts among the edits of various collaborator.

The file server (e.g., one or more) 120 also may enable the efficient and speedy deployment of complex spreadsheet information with a caching tool 220. The caching tool 220 may include caches such as memories that allow scenarios that have been previously run on a particular model instance to be saved and redeployed quickly to the appropriate user at the external API engine 210, rather than fully processing the data again through various engines in the model instance 250. For example, the memory of the caching tool 220 stores previously generated values of the spreadsheet in one or more previous runs that edited spreadsheet file instances. The file server 120 receives an input from the application 112 of a user device 110 to change one or more values of a spreadsheet. The file server 120 checks the input against the previous inputs that are stored in the memory of the caching tool 220. In response to the input matching a previous input, the file server 120 may transmit the previously generated values to the user instead of using the calculation engine 258 to generate the output.

The various engines and components shown in FIG. 2 may be software that includes instructions, when executed by hardware components such as one or more processors, to perform the functionality. For example, the external API engine 210 may include software instructions and network interface component. The spreadsheet file store 240 may include memories and software instructions for storing and retrieving of data. The calculation engine 258 may include instructions that can cause one or more processors to perform calculation and processing of spreadsheets.

Example Client Device

Figure 3:
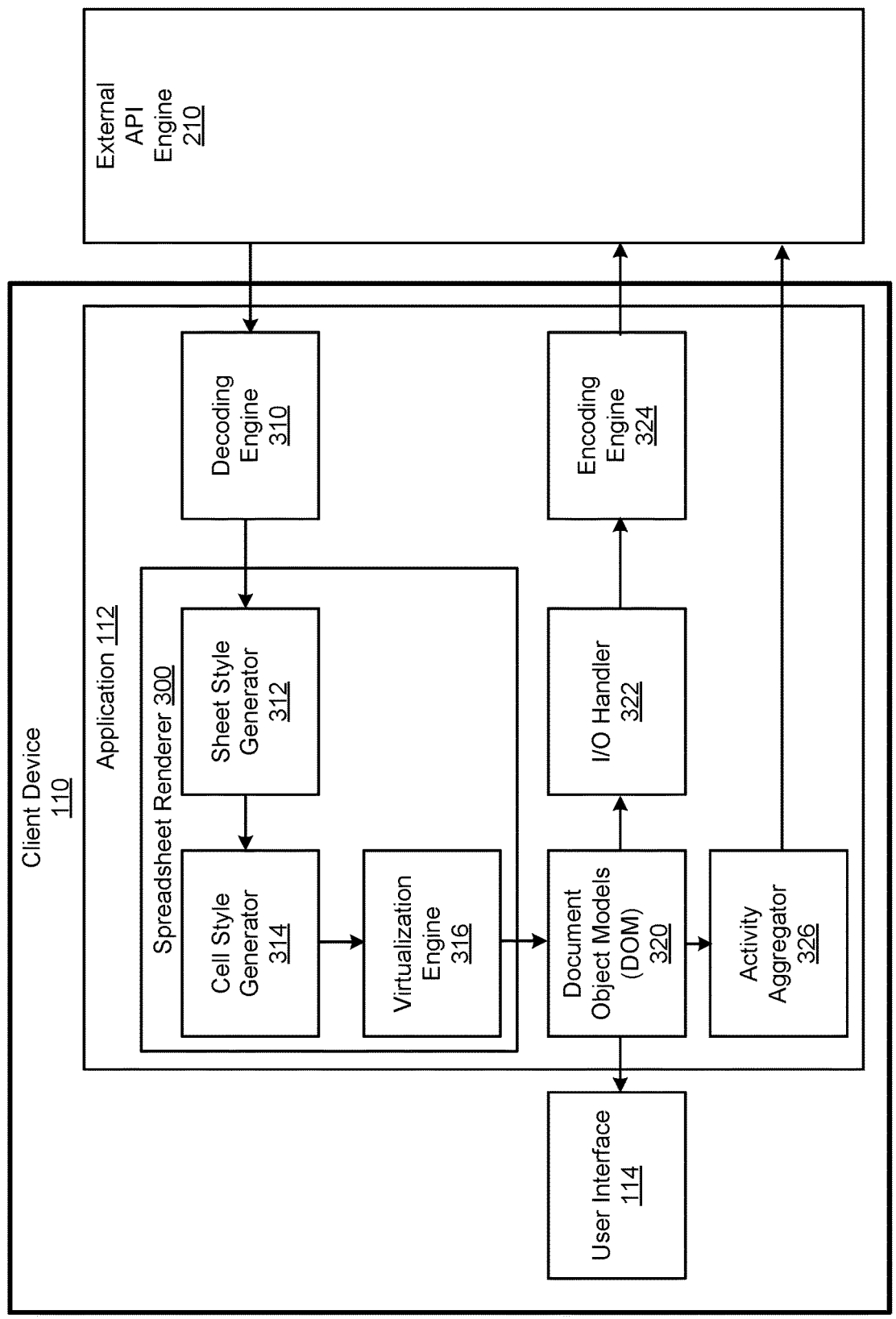
FIG. 3 is a block diagram illustrating an example client device, in accordance with an embodiment.

FIG. 3 is a block diagram illustrating an example client device 110, in accordance with an embodiment. Components of the client device 110 may include all or a subset of the example computing system illustrated and described with FIG. 13. The client device 110 includes an application 112 and a user interface 114 that are installed and operate at the client device 110. The application 112 may include various components such as a spreadsheet renderer 300, a decoding engine 310, a sheet style generator 312, a cell style generator 314, a virtualization engine 316, document object models (DOMs) 320, an input/output (I/O) handler 322, an encoding engine 324, and an activity aggregator 326. The application 112 may include fewer and additional components that are not shown in FIG. 3. The functions of the application 112 may be distributed among the components in a different manner than described. The components of the client device 110, such as the application 112, may include computer code that includes instructions stored in a non-transitory computer readable medium. The instructions, when executed by one or more processors, may cause the processors to perform certain processes described herein.

The application 112 may include a spreadsheet renderer 300 that causes a visualization of a spreadsheet at the user interface 114. In one embodiment, the application 112 may focus on rendering the visualization of data received from file server 120 instead of performing calculations (e.g., calculations related to one or more formulas in the spreadsheet) for generating data values of a spreadsheet. The application 112 operates at a client device 110 that is in communication with the file server 120, such as through the external API engine 210. The application 112 receives, via a network 140, a version of the dataset that includes values generated by the calculations performed by the file server 120. For example, the values generated from applying one or more formulas in the spreadsheet file are calculated at the file server 120 and included in a version of the dataset sent to the application 112 so that the application 112 may focus on visualizing the data instead of performing calculations for the spreadsheet file. A version of dataset may refer to an original version of the dataset that is generated by the calculation engine 258 or a variation of the dataset such as an encoded version encoded in a format for the transmission through the network 140 or another adjusted version. In one embodiment, the dataset received by the client device 110 may correspond to values in a single spreadsheet. In another embodiment, the dataset received by the client device 110 may correspond to values in more than one file that are combined by the file server 120 before the dataset is transferred. The application 112 may use the spreadsheet renderer 300 to visualize a spreadsheet at the user interface 114 using a version of the dataset transmitted from the file server 120. A worksheet in the visualized spreadsheet may be presented as a single worksheet even if values in the worksheet may be drawn from various files by the file server 120. The visualized spreadsheet may display at least a subset of the values in the dataset. For example, the visualized spreadsheet may only display values of the cells in a worksheet that are within the display area of the user interface 114. In another case, the worksheet may be small enough to fit in the entire area so that the at least a subset of values in fact encompasses all data in the spreadsheet. The visualized spreadsheet also may display converted contents instead of protected contents. This feature will be discussed further in detail with reference to encoding and decoding of data below.

To render the values in a spreadsheet efficiently in a user interface 114 such as a web browser, in one embodiment, the spreadsheet renderer 300 may make each cell of a spreadsheet (e.g., one of various cells in one or more worksheets) a document object model (DOM) element. For example, in a version the dataset that is transmitted from the file server 120, the values that correspond to values of cells of the spreadsheet may be stored as DOM elements. In some cases, the DOM element for each spreadsheet cell also may include sub-elements that specify the cell style (e.g., font size, font style, color of cell, boundary of the cell), size and dimension the cell, and attributes of the values (e.g., whether the value is numerical, floating, text, formula, etc.) The use of DOM elements to represent a spreadsheet takes advantage of the regularity of spreadsheet cells to implement algorithmic encoding of large numbers of DOM element locations. The cumulative lengths and widths of preceding cells in a worksheet are used to calculate and designate a location corresponding to the upper left corner of each cell. In this way the spreadsheet renderer 300 can make large spreadsheet renderings viable in a user interface 114 (e.g., a web browser) that may have limited processing capacity via scalable virtualization. By way of example, the spreadsheet renderer 300 may determine coordinates of a particular cell of a worksheet based on widths and heights assigned to preceding cells. Since the spreadsheet may be represented by DOM elements, the particular cell corresponds to a particular DOM element. The preceding cells correspond to preceding DOM elements that precede the particular DOM elements. The DOM element each may have a default height and width. The spreadsheet renderer 300 may check for customized height and width values saved in the DOM elements. Based on the default values and the customized values of the preceding cells, the coordinate of a particular cell may be quickly determined.

The client device 110 may receive a dataset from the file server 120 and visualize the dataset as a spreadsheet. In one embodiment, a client device 110 receives a version of the dataset that includes values calculated by the file server 120 via the network 140. The dataset may include values from more than one files saved in the file server 120. For example, values in a first column of a worksheet may be drawn from a first file saved in the file server 120 while values in a second column of the worksheet may be drawn from a second file saved in the file server 120. The decoding engine 310 receives the dataset in a format that is for the transmission. The decoding engine 310 decodes the dataset to another format for the spreadsheet renderer 300 to visualize the spreadsheet. For example, for the transmission of the dataset, JSON format or other similar formats such as XML may be used while for the visualization of the spreadsheet, JavaScript objects may be used. The dataset may include the values of the cells and also formatting data such as style and dimension information. The decoded dataset is transmitted to the spreadsheet renderer 300.

The spreadsheet renderer 300 may include the sheet style generator 312, the cell style generator 314, and the virtualization engine 316. The sheet style generator 312 receives the decoded version of the dataset (such as in JavaScript objects). The sheet style generator 312 configures certain aspects of the custom encoded objects that impart greater control for the user and enhance overall performance of the browser deployment. The sheet style generator 312 may define additional objects in the DOM, such as objects related to style and format with respect to a particular worksheet. The sheet style generator 312 also may batch DOM write operations to avoid layout thrashing. The sheet style generator 312 also may define the display of gridlines and coordinates, as well as tabs for navigation among different worksheets in the spreadsheet. The cell style generator 314 receives the decoded dataset that is defined with customized instructions for displaying cell information including formats. The cell style generator 314 generates the visual styles of the cells by including the style values in the DOM elements.

With the sheet and cell styles defined in the DOM elements, the virtualization engine 316 may render the spreadsheet by identifying the location and sizing of each DOM element, which, in one embodiment, is equivalent to each spreadsheet cell. A particular virtualization of DOM to may be coded with respect to an entirety of the spreadsheet. For example, in visualizing a spreadsheet at the user interface 114, the virtualization engine 316 may generate, responsive to receiving the dataset, associations among the values of the spreadsheet and a plurality of cells in the spreadsheet. Each value may be mapped to one of the cells in a worksheet based on the DOM element 320. For example, a DOM element may be mapped to a cell in the worksheet. The value included in the DOM element may in turn be associated with the cell.

The virtualization engine 316 may detect a display area of the user interface 114. The virtualization engine 316 may identify a first subset of the cells that are projected to be covered by the display area in the visualized spreadsheet and a second subset of the cells that are projected to be excluded by the display area. The second subset may include cells that are not currently covered by the display area in the worksheet that is currently displayed and also may include cells in other worksheets that are currently not displayed. The virtualization engine 316 may define coordinates of the cells in the spreadsheet and identify the cells that are projected to be covered by the display area based on the coordinates. The virtualization engine 316 may, in turn, cause the user interface 114 to display the values that are assigned to the first subset of the cells based on the association. For example, the virtualization engine 316 may transmit the DOM elements in the format of JavaScript Objects with respect to the first subset of the cells to a web browser. The web browser reads the DOM elements and displays the spreadsheet, the current worksheet, cells, and values in accordance with the DOM elements. The virtualization engine 316 may maintain the association of the values that are assigned to the second subset of the cells even though the second subset of cells are not displayed at the moment.

In one embodiment, the coordinates of the cells in a worksheet may be stored in units of width of columns and heights of rows. The coordinates of a cell may be calculated in runtime by the virtualization engine 316 before the worksheet is rendered at the user interface 114. The dynamic calculation of coordinates may help reducing the data transfer payload from the file server 120 to the client device 110. By way of example, a worksheet may have widths of columns=[$w_1, w_2, w_3, \ldots, w_n$] and heights of rows=[$h_1, h_2, h_3, \ldots, h_n$]. Using a start index of 0, the coordinates of the top left corner of the cell at position cell (n,m) can be quickly determined at the time of rendering the worksheet by the following formula:

$$X \text{ Coordinate} = \Sigma_{i=0}^{n-1}(\text{Width of Columns}[i])$$

$$Y \text{ Coordinate} = \Sigma_{i=0}^{m-1}(\text{Height of Columns}[i])$$

$$\text{Width of Cell} = \Sigma_{i=n}^{n+mx}(\text{Width of Columns}[i])$$

$$\text{Height of Cell} = \Sigma_{i=m}^{m+my}(\text{Height of Columns}[i])$$

In the equations above, mx is a number of merged cells in horizontal direction and my is the number of merged cells in vertical direction. A challenge for virtualizing a very large number of DOM elements is that the exact location and size of each DOM element may be difficult to determine. The use of DOM elements to represent spreadsheet takes advantages of the regularity of the cells of the spreadsheet that enables the application 112 and the user interface 114 to quickly calculate the coordinate of a cell using, for example, the equations above. The coordinates of the cells may be dynamically generated and the generated coordinates may be stored.

The virtualization of DOM elements employed is scalable, meaning it can avoid display lag, or browser crashing, in rendering a spreadsheet no matter how large the spreadsheet is in rows, columns, and/or worksheets (stack) within a workbook and across workbooks. That is, unlike conventional spreadsheets, the disclosed configuration with virtualization of DOM elements allows for referencing across workbooks rather than only worksheets within one workbook.

In one embodiment, the virtualization process continually re-specifies the active DOM portion of the spreadsheet to include the display area currently viewable by the browser, rather than the entire landscape of the spreadsheet. For example, the virtualization engine 316 may receive, via the user interface 114, a user action to move the display area to a new display area. The virtualization engine 316 may identify at least some of the cells in the second subset that are projected to be covered by the new display area. The virtualization engine 316, in turn, causes the user interface 114 to display, based on the associations maintained, the values that are assigned to those cells in the second subset that are covered by the new display area by transmitting the DOM elements corresponding to those cells to the user interface 114. Hence, the virtualization engine 316 may dynamically calculate the position and dimension of every cell from the dataset transmitted from the file server 120. By calculating positions from the data received, the user interface 114 can be made to look like an actual spreadsheet while the virtualization engine 316 can decide which cells are currently in the viewport depending upon how far the user has scrolled. In one embodiment, by rendering only the cells in the display area, performance of the browser is independent of the total number of cells that might be in the spreadsheet.

The virtualization engine 316 may include other additional or alternative features in visualizing a spreadsheet. For example, the virtualization engine 316 may enable scrolling among cells in a browser that simulates the direction keys typically used in native spreadsheets. Also, the virtualization engine 316 may solve for navigation around merged and hidden cells, which may complicate the location algorithms to simulate a native spreadsheet.

The sheet style generator 312, cell style generator 314, and the virtualization engine 316 may work together to overcome certain limitations in virtualization. For example, the use of DOM elements takes advantage of certain structural features of spreadsheets. DOM elements can be the logical elements in a web page that may interact with a user. However, for a large number of DOM elements, a user's action may require the refresh of the DOM elements and the recalculations could impede the performance of the user interface 114. In one embodiment, the virtualization engine 316 pre-maps all the DOM elements but only causes the user interface 114 to display a subset of values in the spreadsheet as the user navigates the spreadsheet in the browser window. Hence, performance is enhanced because the user interface 114 may call a small portion of the entire dataset of the spreadsheet.

The I/O handler 322 may collect and execute user actions on the spreadsheet that are input via the user interface 114. The application 112 may use a batch send feature in communicating the user actions to the file server 120. For example, the user interface 114 may include action buttons such as "Calculate," "Download," "Save Scenario," and "Reset." These control tools enable users to batch send actions. The I/O handler 322 receives a plurality of inputs from a user for editing the spreadsheet. The I/O handler 322 may collect and store the plurality of inputs over time as a batch. The I/O handler 322 may transmit the batch to the file server 120 for performing calculation associated with the spreadsheet file instance that is used by the user. The transmission of the batch may occur after a predetermined amount of time since last patch was sent, after the I/O handler 322 collecting a predetermined number of inputs, or after the user clicking a button at the user interface 114 or sending a request to submit the inputs to the file server 120 for calculation. By batching changes and edits, the file management system can run a spreadsheet recalculation without performance degradation. For example, the user interface 114, which may not handle the calculation, does not need to refresh the data every time the user makes a change to the spreadsheet. The file server 120, which may have a significantly more processing power than a client device 110, may wait for the entire batch of changes to perform the calculation. This treatment also may enable the system to maintain the file server 120 in a stateless condition (although the file instances in a file pool may be referenced to a zero-state condition).

To further improve the performance of the spreadsheet, the system may allow asymmetrical transmissions of data between a client device 110 and the file server 120. In various embodiments, the batch transmitted to the file server 120 may include only the edited values of the spreadsheet while the data transmitted back to the client device 110 may include the entire set of the data in the spreadsheet. For example, in one embodiment, the original data of the spreadsheet correspond to a first dataset. The batch transmitted to the file server 120 may include the edited values of the first dataset, but may exclude values that are unchanged. The file server 120 perform calculations associated with the edited values of the spreadsheet to generate a second dataset that represents the values in the updated spreadsheet. The second dataset includes updated values and unchanged values that are unchanged from the first dataset. The file server 120 may transmit the second dataset (e.g., the entire second dataset) that includes both the updated values and the unchanged values to the application 112. The application 112 may visualize only a portion of the second dataset that corresponds to the current view of the spreadsheet but may maintain the associations of other non-displayed values to cells so that the application 112 is ready to cause the display of any values in the spreadsheet.

The activity aggregator 326 may collect usage data related to a collaborator on editing or other activities of a file instance of the spreadsheet. The activity aggregator 326 may transmit the collected data to the reporting engine 256 of the file server 120 to provide a degree of surveillance for the owner of the spreadsheet. This feature allows the owner of a spreadsheet in various embodiments to exercise better control and permission on the content and confidentiality of the spreadsheet compared to users using conventional native desktop spreadsheets or cloud spreadsheets. The reporting engine 256 may generate a report summarizing or detailing various activities of different collaborators based on the data transmitted from the activities aggregator 326 and/or the calculation engine 258. The usage data collected by the activity aggregator 326 may include data specified to a particular cell or a particular calculation. This enables the owner to review the exact usage by collaborators with respect to any action, cell, and calculation.

The various engines and components shown in FIG. 3 may be software that includes instructions, when executed by hardware components such as one or more processors, to perform the functionality.

Example Encoding and Decoding of Data

The rendering and processing data of a spreadsheet, various components of the client device 110 and the file server 120 may handle the data using different formats. In various embodiments, the encoding engine 260 and the decoding engine 254 of the file server 120 and the encoding engine 324 and the decoding engine 310 of the application 112 may convert data of the spreadsheet from one version to another for different purposes. For example, the format of the DOM elements for the dataset used to visualize the spreadsheet may be different from the format of the DOM elements used for transmission through the network 140. The format used for the calculation engine 258 also may be different.

The encoding engine 260 and the encoding engine 324 may use algorithmic encoding to compress delivery of data between the client device 110 and the file server 120. The encoding engine 260 and the encoding engine 324 may provide for translation between spreadsheet language and browser language used in the user interface 114. The encoding engine 260 and the encoding engine 324 also may facilitate the tailoring of information and protection of data specified by the owner of a spreadsheet model instance 250 (e.g., the original uploader of a spreadsheet that is used to create the pool of spreadsheet file instances 270).

With respect to compression of data, the encoding engine 260 or the encoding engine 324, in encoding a dataset of a spreadsheet, may recognize repeating patterns of information and reduce the transmittal of that information to reduces the number of packets required for transmission. For example, an example string of 8 repeated characters (1,1,1, 1,1,1,1,1) could be reduced to 2 characters (1,8). The transmittal of just 2 characters rather than 8 significantly reduces the payload, making the delivery of the high capacity spreadsheet information practically even when the user interface 114, such as a web browser, has lower capacity. The encoding engine 260 or the encoding engine 324 may tailor the compression to specific application and transmittal of spreadsheet-related information patterns.

The encoding and decoding also may facilitate translation between spreadsheet language and browser language used in the user interface 114. Encoding allows the system to map and translate certain aspects of the code found in a spreadsheet to the code used in the browser. These may include the mappings between format options available in the spreadsheet application and the format options available in the browser application that are usually not consistent. In one embodiment, the format used in transmission of the data packet may be in the JSON format, the format used in rendering of the visualization in a web browser may be in the JavaScript object format, and the format used in calculation by the calculation engine 258 may yet in another format, such as a spreadsheet format.

Encoding allows the owner of the spreadsheet to protect the contents and intellectual properties (IP) in the spreadsheet that are normally not protectable using a conventional desktop spreadsheet file. The encoding engine 260 may convert the protected contents to converted contents (e.g., information in formats or values different from the original protected contents) before the dataset carrying the values of the spreadsheet is transmitted over the network 140 to a client device 110 so that the protected contents are not transmitted to the client device. In one case, the conversion may include changing the substantive values in the protected contents (e.g., by changing a formula to a value). In another case, the conversion may not include a substantive change in the values of the protected contents. Instead, the format of the cell is changed. For example, a protected cell may be changed from editable to locked.

The content protection of a spreadsheet may be enforced based on one or more rules. By way of example, the file server 120 may enforce one or more rules that may apply generally to any cells of a spreadsheet or that may be specific to a particular cell or a group of cells in the spreadsheet. The file server 120 may encode the dataset based on rules imposing one or more restrictions on one or more cells of the spreadsheet. The rules may include a general rule of the file server 120 and another customized rule that is specified by an owner of the file. A rule may specify that at least one formula or code associated with one or more cells that are restricted by the rule is hidden from collaborators. Another rule may specify that certain cells are editable while other cells are locked. Other suitable rules of various content protection and regulation also may be possible. By contrast, in a conventional desktop spreadsheet, information such as formulas and code are often available to the users who have access to the file, even if that information is apparently hidden. Encoding at the encoding engine 260 by converting protected contents (e.g., formulas, code, rules, values identified by one or more rules) to another format enhances the intellectual property and content protection of the spreadsheet because, unlike a conventional desktop spreadsheet whose confidential information is saved with the file, in some embodiments, the protected contents are not transmitted to the client device 110.

In one embodiment, the file server 120 may allow custom encoding that is specified by a user, such as an owner of a spreadsheet. For example, the file server 120 may receive one or more rules from the owner. The custom encoding may enhance and tailor the functionality of the spreadsheet. A user (the owner or a collaborator who has been authorized) may specify rules for usage of the spreadsheet file in the user interface 114. The rule may be cell-specific (e.g., hidden cells, locked cells, conditional status of cells, and others). In addition to, or alterative to, a general rule of the file server 120 that may apply to various files, a customized rule allows owners to impose specific rules on their own files. For example, in one case, the file server 120 may receive, from the owner, a rule specifying that all formulas in a spreadsheet are protected contents. The converted contents in this case may include values that are calculated from the formulas so that the formulas are hidden from collaborators when viewed at a user interface 114. In another case, the protected contents may be certain formulas specific to certain cells instead of all formulas. Similarly, a rule also may specify that the protected contents be any background code of a spreadsheet. Custom encoding allows the owner to tailor visibility of contents to users in a way that may not possible using a conventional desktop spreadsheet.

The rules also may be specific to a certain collaborator or be applicable to all collaborators. For a particular spreadsheet file instance, the user interface 114 may receive a user input change. The I/O handler 322 may create data objects (e.g., JavaScript objects) reflecting the actions by the user. The I/O handler 322 may forward these data Objects to the encoding engine 324. The encoding engine 324 may convert these data objects to another format (e.g., JSON) to allow the information to be transmitted efficiently across the network 140. The encoding at encoding engine 324 also may include specification of types of data (numeric, string, location) that are applicable to particular inputs and that may be required for the proper functioning of the calculation engine 258. The datasets transmitted from the client device 110 may be received by external API engine 210. The datasets may be checked against previously cached scenarios at caching tool 220, be vetted for user permissions and security at the user management security engine 212, and subsequently be routed to the proper model instance 250 by the service discovery engine 230.

The content protection may be cell-specific. For example, in a spreadsheet file instance that is saved in the file server 120, the spreadsheet file instance may include a first cell that is associated with protected contents and include a second cell that is associated with unprotected contents. Unprotected contents may be contents that are not subject to any content protection rules. On the file server 120 side, the protected contents and the unprotected contents both may be any values, formulas, codes, objects, charts, or other suitable contents. Before the dataset representing the spreadsheet file instance is transmitted via the network 140 to a client device 110, the file server 120 may encode the contents in the spreadsheet file instance. In encoding the protected contents, the file server 120 may convert the protected contents into converted contents so that the protected contents are not transmitted to the client device 110. In encoding the unprotected contents, the file server 120 may simply put the unprotected contents in a format that is efficient for network transmission. The client device 110 can decode the dataset to re-generate the unprotected contents but not the protected contents. As a result, the spreadsheet visualized at user interface 114 may display the converted contents at the first cell and the unprotected contents at the second cell.

When a dataset is transmitted to a file management system 125 at the file server 120, the datasets are decoded at the decoding engine 254. For example, the decoding engine 254 may receive a dataset in a first format (e.g., JSON) transmitted over the network 140. The decoding engine 254 may translate the dataset into a second format (e.g., in Java objects). The data values, such as those in Java objects, may be sent to the calculation engine 258 to be applied to one of the spreadsheet file instances in the pool 270. The data values may include integers, strings, and coordinates specifying the input cells. The calculation engine 258 performs calculations and processing of the values in the spreadsheet. The calculation engine 258 also may check one or more rules associated with the spreadsheet to determine whether the edits in the dataset transmitted from a client device may contradict any of the rules. For example, a rule may restrict the change to a particular cell. Any edit in an attempt to change the cell may be rejected by the calculation engine 258.

The encoding engine 260 perform various encoding operations to the dataset generated by the calculations of the calculation engine 258. Several types of encoding operations may be performed by the encoding engine 260. First, the encoding engine 260 may convert the format used in calculations (e.g., Java objects) to a format used in efficient data transmission across the network 140 (e.g., JSON). Second, the encoding engine 260 also may apply certain compression algorithms related to the data, particularly to the values of the spreadsheet. By way of example, the cells in the spreadsheet are checked for formatting data. The formatting data can include parameters such as color, border status, size, font type, etc. In compressing the dataset, if a cell to the left of a first cell contains same formatting information to the first cell, the duplication is recorded rather than repeating the formatting data again for each cell. In one embodiment, if a group of cells has similar formats, the formatting is transmitted for the one of the cells in the group only and the remaining cells in the group are marked as having the formats.

Third, the encoding engine 260 may apply rules for mediating inconsistencies between a spreadsheet environment and the user interface 114 such as a browser environment. For example, a typical spreadsheet may have more options for formatting of borders than browsers have. In order to render spreadsheets effectively in a browser environment, the encoding engine 260 may apply rules specified by the owner in cases where an exact formatting match is not available between the spreadsheet language and the browser language.

Fourth, the encoding engine 260 applies one or more rules (e.g., content protection or restriction rules) to encode the dataset before the dataset is transmitted to a client device 110. Based on the rules, the encoding engine 260 may display partial or total information related to the output from the calculation engine 258, thereby facilitating greater customization of the user interface. The encoding engine 260 convert protected contents of at least one cell to converted contents. For example, if a rule specifies that a column or a cell is hidden, the values associated with those cells are removed. In another case, if a rule specifies that the formula associated with a cell should be hidden, the encoding engine 260 may convert the protected contents (e.g., the formula in this case) to converted contents (e.g., the actual value) and transmit only the converted contents to the client device 110. Hence, the user of the client device 110 will not have access to the formula and content protection is achieved. Other types of content conversion based on the rules specified by the owner of the spreadsheet can be performed. The file server 120 transmit the encoded dataset to the application 112. If a rule is applied, one or more values in the dataset transmitted may be generated in accordance with the rule. For example, the formula associated with a cell may be stored at the server 120 and the data value generated by the formula may be transmitted to the application 112 without including the formula.

Example Automatic Model Update

The file server 120 may include a model update engine 280 that allows the file server 120 to update a destination file from a source file based on mappings and checksums between the source and destination files. As additional source files are received, the file server 120 may automatically further update the destination file to reflect the added or changed data in various source files. In this manner, the owner of a file can establish a configuration that facilitates updates between multiple files by multiple users using the user interfaces 114 such as web browsers. The source files and the destination file can be of any suitable formats. For example, either or both the source file and the destination file can be spreadsheets.

By way of example, the file server 120 may receive a mapping file that designates the mapping between the fields (such as cells in spreadsheet) of the source file and the destination file. The file server 120 may store the mapping file. The mapping file may be uploaded by a user or may be created using the user interface 114 in a graphical user interface 400 that will be discussed in further detail with reference to FIG. 4. The destination file may include multiple fields and data values in different fields. A source file also may include multiple fields and data values. The mapping file may link a particular field in the destination file to a particular field in the source file. The file server 120, after receiving a new source field, identifies any fields that are specified in the mapping file and use the data values in those fields to update the destination files. The update may include replacing the old value in the destination file with the value in the source file. The update also may be adding new values to the destination file. For example, in one case, the destination file may be a financial statement of a company over multiple quarters that are saved in a spreadsheet. The source file may be the new data for the financial data of a recent quarter. The update may add a column to the destination file to include the new data. The newly added cells may displace the original cells based on a direction specified by the user in the mapping file. For example, the new column may be added to the first (e.g., leftmost) column and the existing data in the destination file is displaced to one column right. In another case, the new column may be added to the last column and no existing data is displaced. Other suitable ways and cell-specific updates may be possible.

Example User Interface and Interaction Medium

FIG. 4 illustrates an example graphical user interface (GUI) 400 that may be an example of the user interface 114 and may be part of the application 112, in accordance with an embodiment. In one case, the GUI 400 may be run as an application in a web browser. In other cases, the GUI 400 may be the GUI of a software application installed on the client device 110. The GUI 400 includes a left panel 410, a central panel 420, and a right panel 430. Note that the panels 410, 420, and 430 also may be referred to as first, second, and third panels and may be able to be rearranged relative to each other. The panels 410, 420, and 430 may divide the GUI 400 into other suitable divisions. The left panel 410 may display a source file 412, which, in the embodiment shown in FIG. 4, may be a spreadsheet that includes a plurality of cells. There may be more than one panel 410 to display multiple source files that are mapped to a destination file. The central panel 420 may display a work station for a user to construct a mapping file 422, which is currently displayed in the central panel 420. The right panel 430 may display a destination file 432, which, in the embodiment shown in FIG. 4, may be another spreadsheet that also includes a plurality of cells. Each spreadsheet 412 or 432 may include more than one worksheets that are represented in different tabs. For example, the source file 412 currently displays the tab "SA" and the destination file 432 currently displays the tab "DA."

A row (or any suitable set of cells in a direction) in the mapping file 422 may represent a mapping entry. A mapping entry connects cells of the source file 412 to cells of the destination file 432 so that the file server 120 may automatically update the destination file 432 according to the mapping entries in the mapping file 422. A mapping entry may include different information, such as "field name," "name location," "value location," "expected vector" of the source file 412 and "field name," "name location," "value location" of the destination file 432. After the mapping entries are created, the file server 120 may automatically import data from the source file 412 to the destination file 432 to the correct locations in the destination file. For example, if a mapping entry connects cell B2 of the source file 412 to the cell A3 of the destination file 432, the file server 120 can update information related to the cell A3 of the destination file 432 when a source file 412 is received. In using the central panel 420, a user may manually type in each information to create a mapping entry. The GUI 400 also has interface features that allow users to quickly create a mapping entry.

Figure 5B:
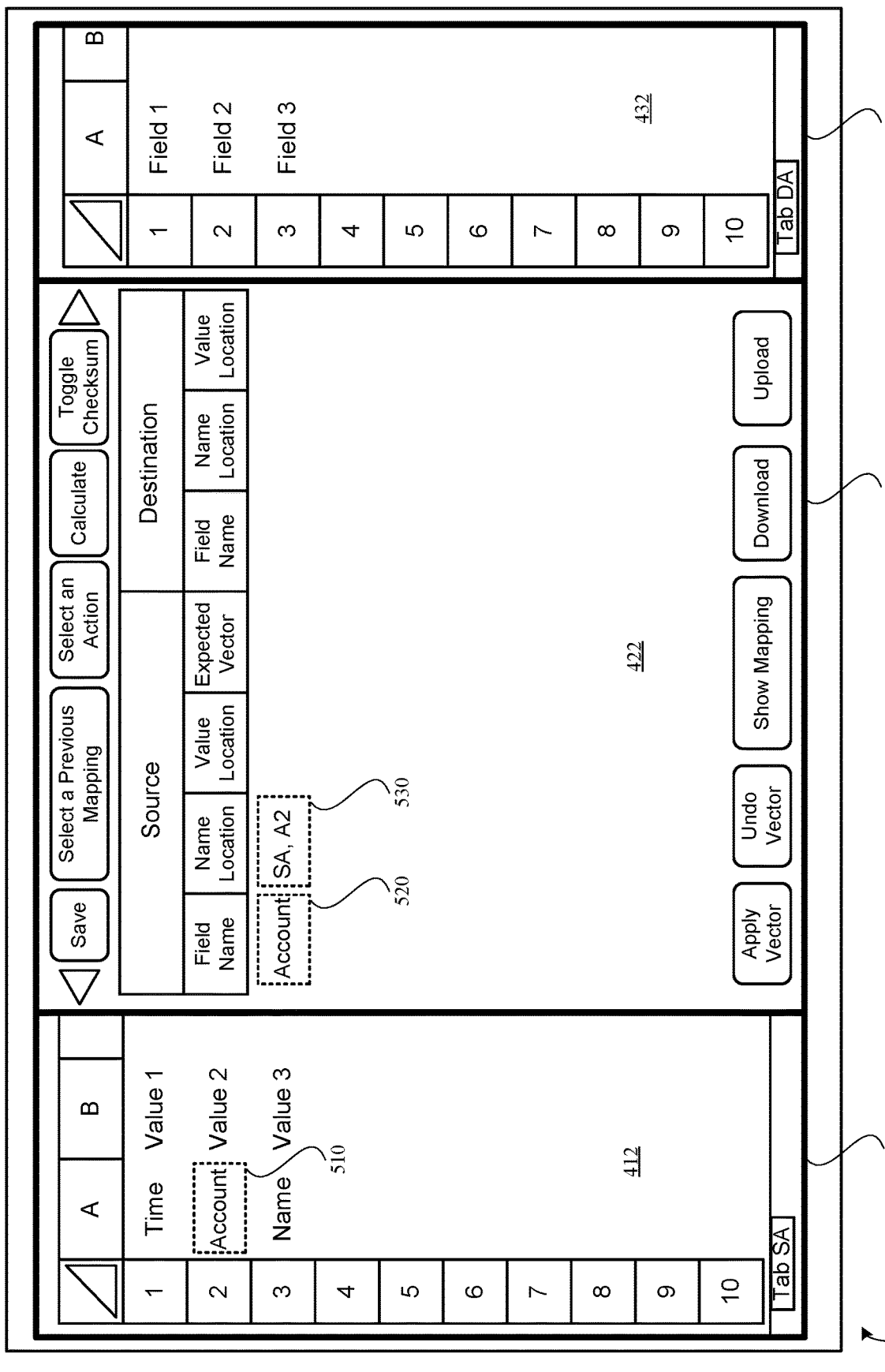
Figure 5C:
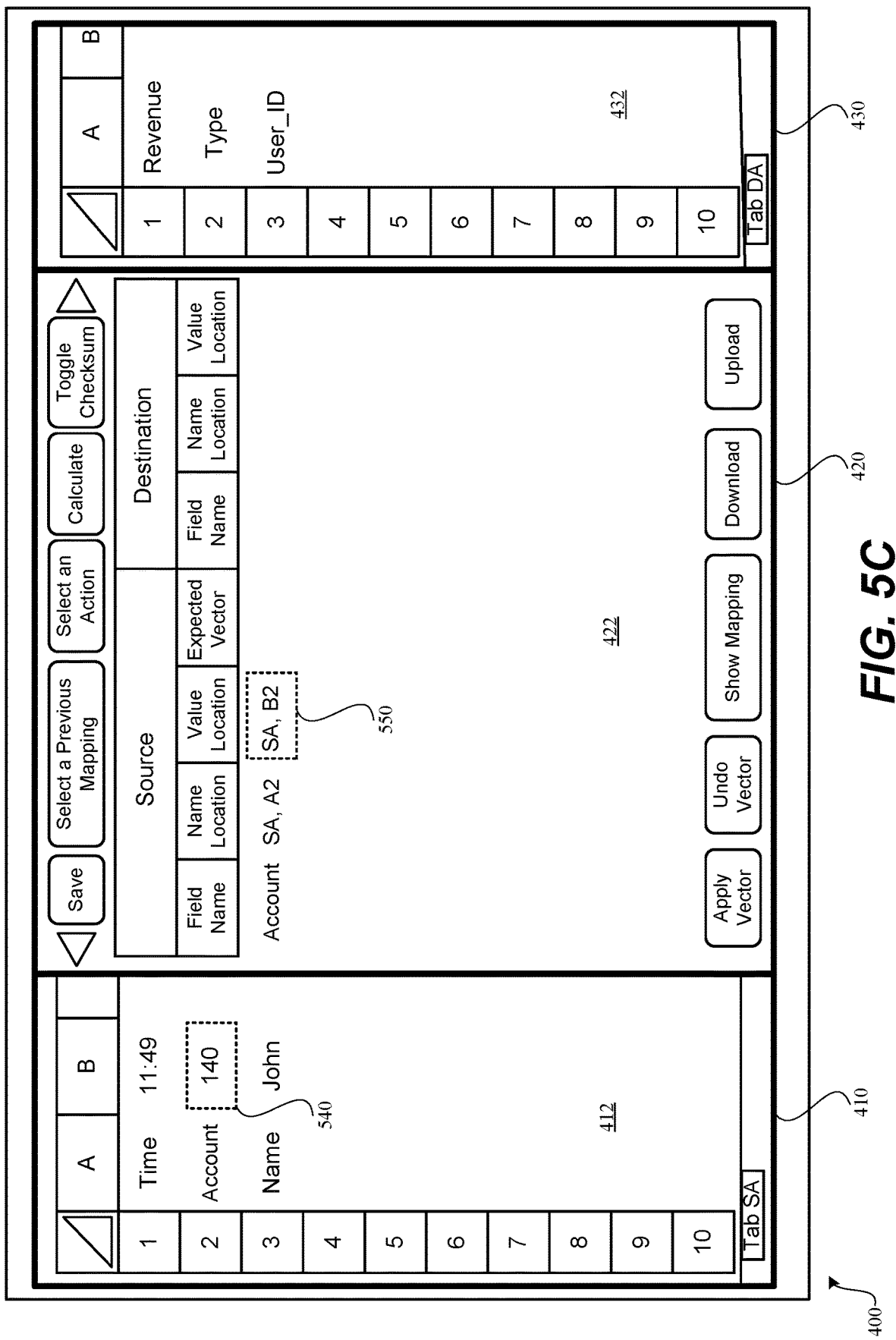

FIGS. 5A, 5B, 5C, and 5C illustrate an example process in creating a mapping entry in the mapping file 422, in accordance with an embodiment. The GUI 400 allows a user to copy a cell from the source file 412 or the destination file 432 to the mapping file 422. The GUI 400 will automatically detect the values need to be pasted to the mapping file 422 and paste the values to a mapping entry. The type of values pasted to a mapping entry may depend on the type of information. For example, in FIG. 5A, a user may copy (e.g., by using right click to select copy or by using a shortcut such as CTRL+c) the cell A2 of the source file 412, as illustrated by the box 510. The cell A2 has the value "Account." In FIG. 5B, the user may paste the value to "field name" of the mapping file 422 in creating a mapping entry. In response, the GUI 400 automatically create two entries. First, the GUI 400 copies the value "Account" of cell A2 of the source file 412 to the "field name" of the mapping file 422, as indicated by the box 520. Second, the GUI 400 creates a coordinate "SA, A2" at the "name location" of the mapping file 422, as indicated by the box 530. "SA, A2" indicates that the cell being copied is from the worksheet with the identifier "SA" at the cell "A2" of the source file 412. In FIG. 5C, the user continues to copy values from the source file 412 to the mapping file 422. For the step shown in FIG. 5C, as indicated by the box 540, the user copies the cell B2, which has the value "140." The user performs a paste operation at "value location" of the mapping file 422, as indicated by the box 550. The GUI 400, instead of pasting the actual value "140," generates a coordinate "SA, B2" of the cell that is copied. "SA, B2" indicates that the cell being copied is from the worksheet with the identifier "SA" and at the cell "B2" of the source file 412.

In other words, the mapping file 422 has different types of cells. Each type stores different kinds of information. For example, cells such as "field name" stores actual values. Cells such as "name location" and "value location" store cell coordinates of the source file 412 or the destination file 432. Cells such as "expected vector" store yet another type of information that will be discussed below. The GUI 400 determines the type of cell that is being inputted and automatically generates values based on the type of cell. For cells that store values, the GUI 400 may generate the actual value that is copied. For cells that store coordinates, the GUI 400 may generate the coordinate values automatically based on the coordinate of the cell being copied in the source file 412 or the destination file 432.

Figure 5D:
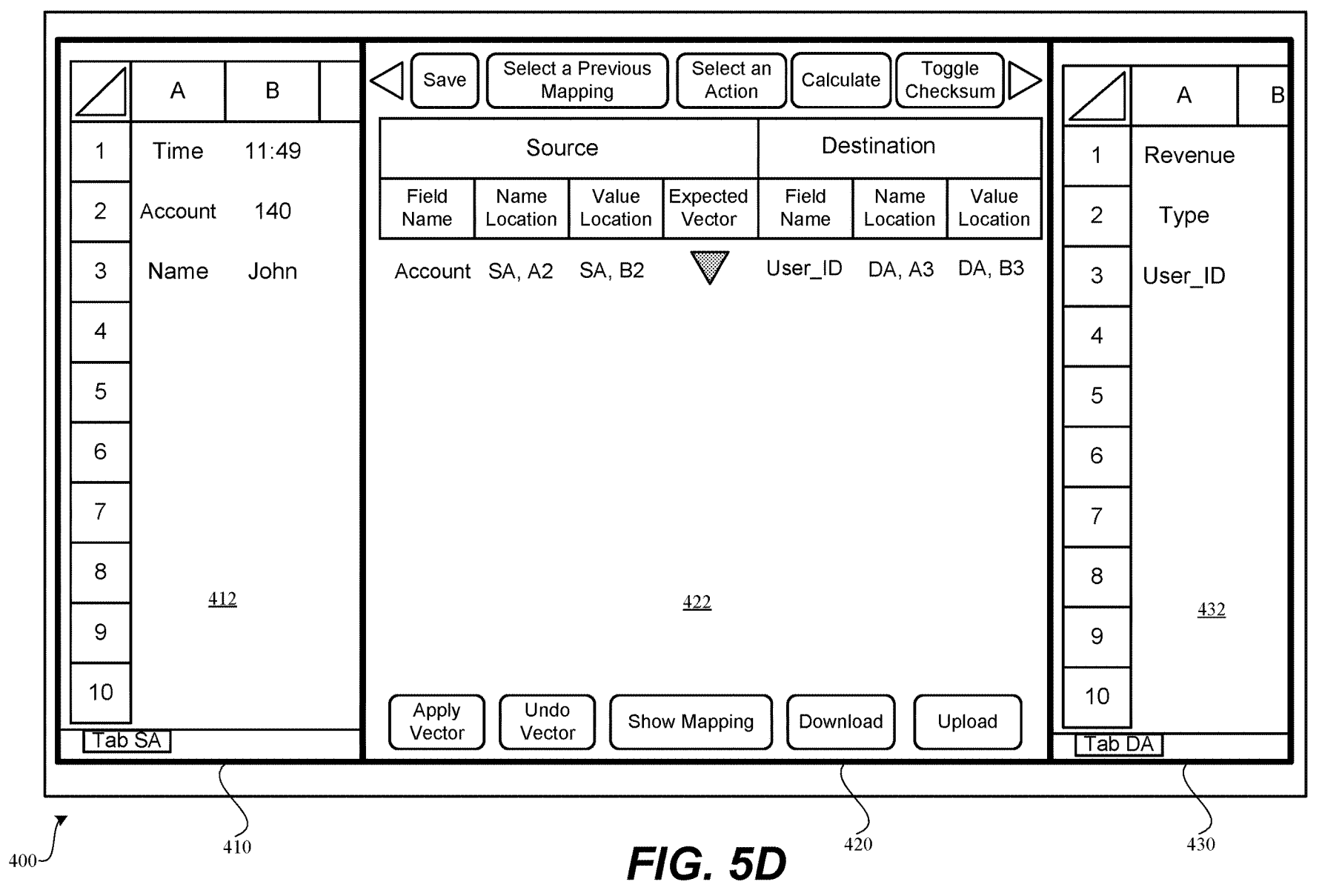

A user may continue the process of creating a mapping entry to complete the entry. In some cases, not all information of a mapping entry needs to be filled out. FIG. 5D shows an example mapping entry. The "expected vector" cells may include a drop-down menu for a selection of direction or replacement of data. Note that the destination file's "field name" may not always need to match the source file's "field name." The mapping can be created and customized by a user. After one or more mapping entries are created, the file server 120 may import the values from a source file 412 to the destination file 432 in accordance with the mapping in a manner that will be discussed with reference to FIGS. 6A and 6B. When additional source files 412 are received by the file server 120, the file server 120 may automatically update the destination file 432 based on the mapping file 422 already created. Users also may adjust the mapping file 422 when a new source file 412 is received.

FIGS. 6A and 6B are conceptual diagrams illustrating update processes of the destination file 432 based on the mapping entries in the mapping file 422, in accordance with an embodiment. The user may specify how an update is added to the destination file 432 using the "expected vector" feature, which allows the user to specify the type of action used to update the destination file 432, such as the direction of a new value to be added. For example, in FIG. 6A, an example mapping entry 610 is shown. The mapping entry 610 maps the value location B2 of the source file 412 to the value location B3 of the destination file 432. The expected vector 612 is set by the user as the right direction. In updating the destination file 432, the file server 120 may identify the cell location B3 in the destination file 432 and may add the value of the cell location B2 in the source file 412 according to the direction specified by the vector 612. Since the vector 612 is set at the right direction, the value "140" from cell B2 of the source file 412 is added to cell C2 of the destination file 432 (cell C2 is right of cell B2). In another example mapping entry 620 shown in FIG. 6B, the values in the mapping entry 620 are the same as those in the mapping entry 610 except that the vector 622 is set at the left direction. In updating the destination file 432, the file server 120 add the value "140" from cell B2 of the source file 412 is added to cell B3 of the destination file 432 and the original B column of the destination file 432 is shifted right.

The directions available for selection for the "expected value" may include up, down, left, right, and no direction. The value added to the destination file 432 will be added to a cell based on the direction specified in the "expected value." In the case of no direction, the file server 120 may replace the original value in the cell of the destination file 432. For example, the value "118" at the cell B3 of the destination file 432 may be replaced by the value "140." Using the expected vector feature and one or more mapping entries, the destination file 432 may be automatically updated. For example, in the case of a financial statement as the destination file 432, the source file 412 may be an update of the financial data in a recent quarter. The file server 120 may create a new column to store the new quarterly data using the expected value and mapping features.

Figure 7:
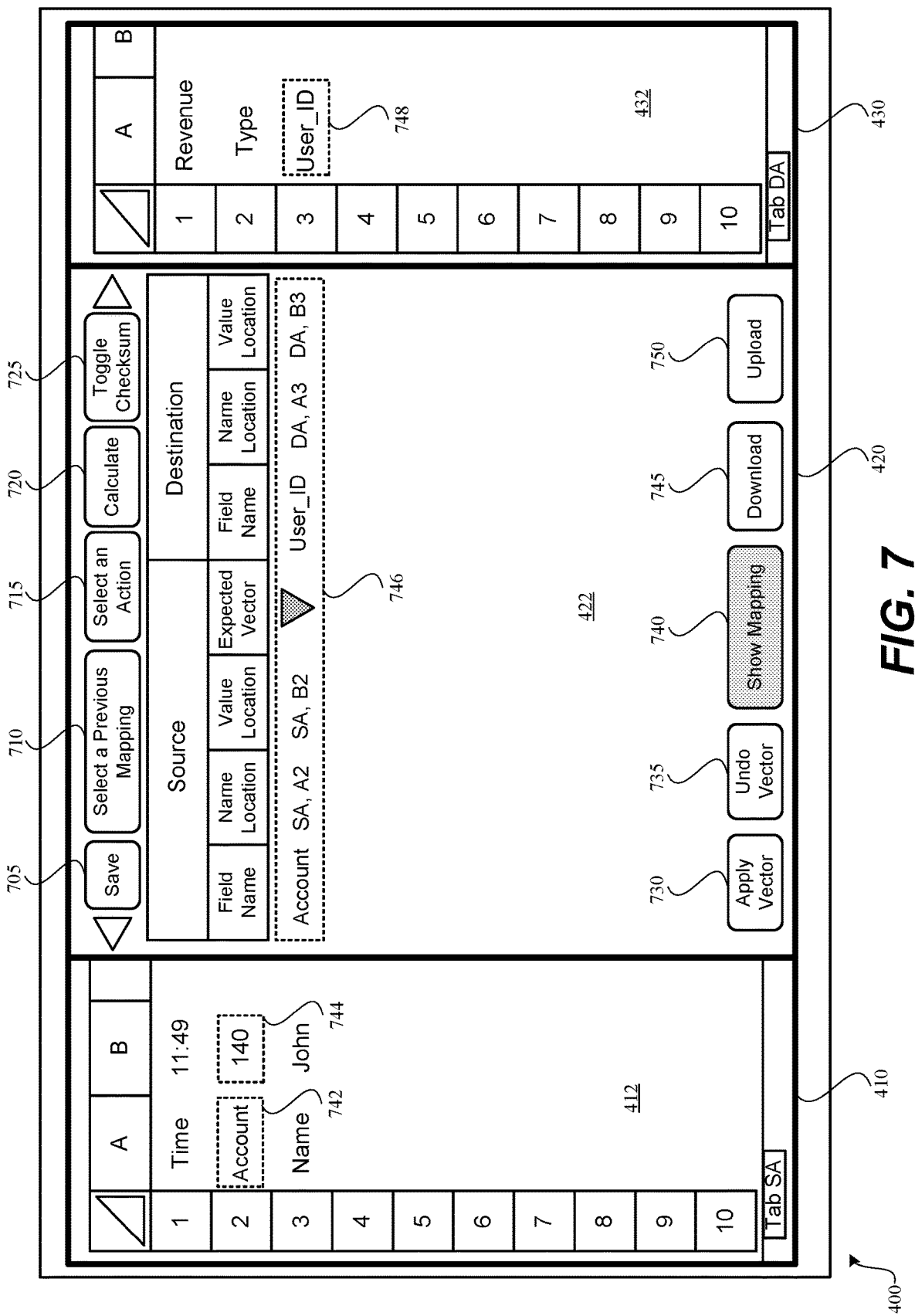
FIG. 7 is a conceptual diagram of a GUI to illustrate example features of the GUI, in accordance with an embodiment.

FIG. 7 is a conceptual diagram of the GUI 400 to illustrate other example features of the GUI 400, in accordance with an embodiment. The GUI 400 may include one or more control elements (e.g., buttons) for performing different operations associated with creating a mapping file 422. Not all GUI 400 in various embodiments need to include any or all of the control elements shown in FIG. 7. The control element 705 allows a user to save the mapping file 422. The control element 710 allows users to select a previous mapping. For example, after selecting a previous mapping, one or more previously stored mapping entries may populate in the panel 420. The control element 715 allows users to select an action related to a mapping entry. The action may be delete, move, copy, or another suitable action. The control element 720 is an example type of "batch send" action that allows the client device 110 to upload the edited data to the file server to perform calculation. After the "calculate" button is selected, a previous of the updated destination file 432 that has data from the source file 412 merged with the existing data will be displayed and/or available for download.

The control elements 730 and 735 also may one or more actions related to an "expected vector" to show the effect of the data shifting or movement when the vector is applied. FIG. 7 shows the effect of the selection of the control element 740. When the "show mapping" button is selected, the user may select a mapping entry 746 in the central panel 420. In turn, the GUI 400 will highlight the cells that are linked in the mapping entries in the panels 410 and 430. For example, cells A2 and B2 of the source file 412 are highlighted, as shown by the boxes 742 and 744. The cell A3 of the destination file 432 is also highlighted, as shown by the box 748. The control elements 745 and 750 allow users to upload and download the mapping file 422 in a suitable format. For example, the mapping file 422 may be downloaded to a format such as Excel, CSV, pdf, etc. A user may edit the mapping file 422 locally and upload the file back to the GUI 400. The left arrow and right arrow buttons 755 and 760 allow the movement of the panels 410, 420 and 430 within the GUI 400. For example, the click of the left arrow 755 may shift the panels 410, 420 and 430 to the left, thereby displaying a larger portion of the right panel 430. Conversely, the click of the right arrow 760 may shift the panels 410, 420 and 430 to the right, thereby displaying a larger portion of the left panel 410.

The control element 725 allows users to create a customized checksum. The checksum associated with the GUI 400 may be a customized aggregation of different data field in a file. The checksum feature may be performed by the GUI 400 or the file server 120. For ease of reference, GUI 400 is used in the discussion. FIG. 8 illustrates an example use of the checksum feature. In some cases, a cell in a spreadsheet is an aggregated value of other cells. For example, the cell B4 of the source file 412 is the total for the cell values of the cells B1, B2, and B3. The GUI 400 may receive a designation of a cell as the aggregated cell and a designation of multiple component cells that should be aggregated to generate the value of aggregated cell. The GUI 400 also may receive a formula in aggregating the component cells. In the example shown in FIG. 8, the formula is a simple sum (e.g., B1+B2+B3=B4), but the formula may include other more complicated mathematical computations. The GUI 400 updates the destination file 432 based on the mapping entries and the vectors that specify the update directions. The GUI 400 may transfer the value of the aggregated cell from the source file 412 to the corresponding aggregated cell in the destination file 432. The GUI 400 also may transfer the values of the component cells from the source file 412 to the corresponding component cells in the destination file 432. The GUI 400 may calculate the aggregation of the component cells in the destination file 432 according to the formula to determine a determined aggregated value (e.g., 80+70+ 40=190). The GUI 400 may compare the determined aggregated value to the value stored in the aggregated cell in the destination file 432 to determine whether the two values match. The checksum feature may be used to verify whether the mapping entries in the mapping file 422 are created correctly. For example, if the cell B3 in the destination file 432 is incorrectly mapped to the "unrelated field" whose value is stored at cell B5 of the source file 412, the updated destination file 432 will have a value of "100," instead of "40" at the cell C3. The determined aggregated value will become 80+70+100=250, which will not match the value "190" at the aggregated value C4. The GUI 400 may identify mapping entries that may contradict the checksum results for users to correct the mapping entries.

The GUI 400 working with the file server 120 may include any features that are discussed in other figures. For example, the GUI 400 also may have the content restriction and protection features that limit a collaborator's permission to edit or view one or more cells. Based on the content protection, the files shown in both left and right panels 410 and 430 may be editable while some specific locations in those files may be restricted. Also, the values in the source file 412 and the destination file 432 may be encoded as DOM elements for easy virtualization and display at GUI 400.

Example Processes

Figure 9:
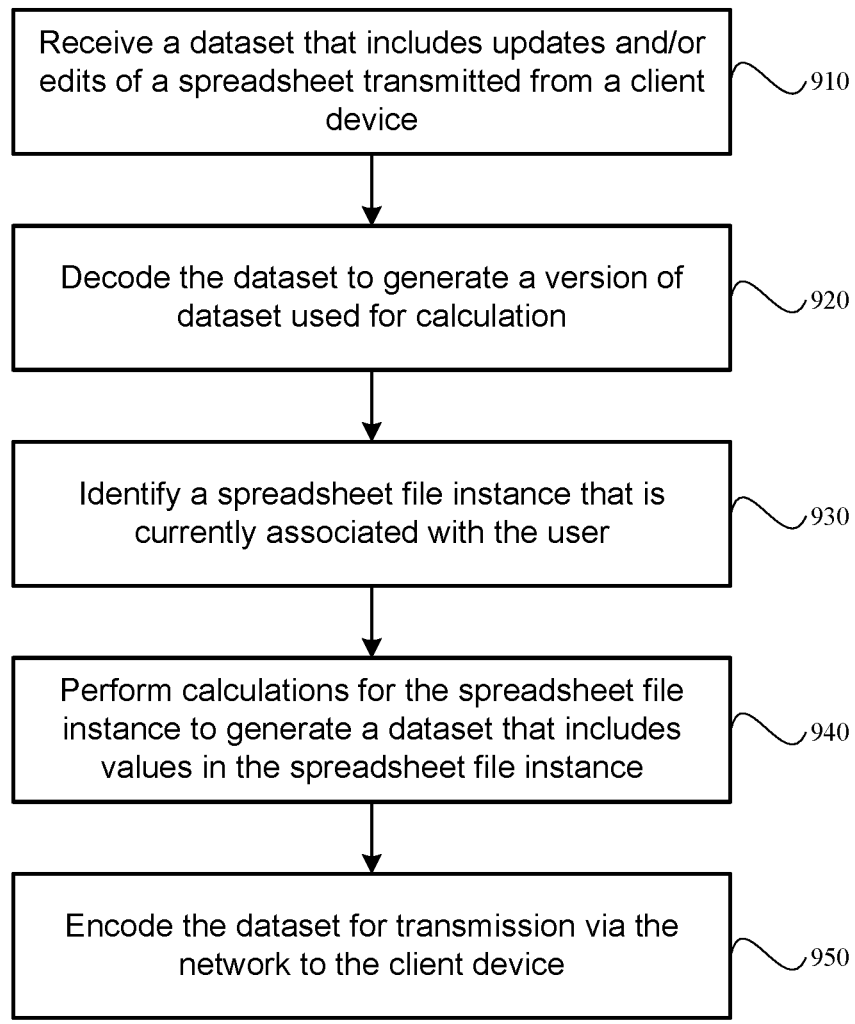
FIG. 9 is a flowchart depicting an example process that may be performed by a file server, in accordance with an embodiment.

FIG. 9 is a flowchart depicting an example process 900 that may be performed by the file server 120, in accordance with an embodiment. The file server 120 may receive 910 a dataset that includes updates and/or edits of a spreadsheet transmitted from a client device 110. The file server 120 may decode 920 the dataset to generate a version of the dataset used for calculation. The file server 120 may identify 930 a spreadsheet file instance that is currently associated with the user. The file server 120 may perform 940 calculations for the spreadsheet file instance to generate a dataset that includes values in the spreadsheet file instance. The calculations may include any suitable calculation of values discussed in FIGS. 2 and 3 and updates of values discussed in FIG. 4. In performing the calculation, the file server 120 may check for any restriction associated with one or more cells that are imposed on the user. The file server 120 may encode 950 the dataset for transmission via the network 140 to the client device 110. In encoding the dataset, the file server 120 may check for one or more rules that restrict the contents of the spreadsheet. Some cells are not subject to any rules that restrict the contents. The contents of those cells may be unprotected contents. On the other hand, protected contents of one or more cells may be converted from one format to another. For example, if the formula associated with a cell is protected, the formula may be converted to value so that the user is not able to see the formula. Protected contents are usually not transmitted to a client device unless a rule specifies otherwise. In one case, the encoded dataset for transmission may include converted contents and unprotected contents. In another case, the encoded dataset for transmission may include only unprotected contents because a particular spreadsheet file instance does not include any rule restriction. In yet another case, the encoded dataset for transmission may include only converted contents because a particular spreadsheet file instance is subject to a global rule that restricts all cells in the spreadsheet. Other situations are also possible.

Figure 10:
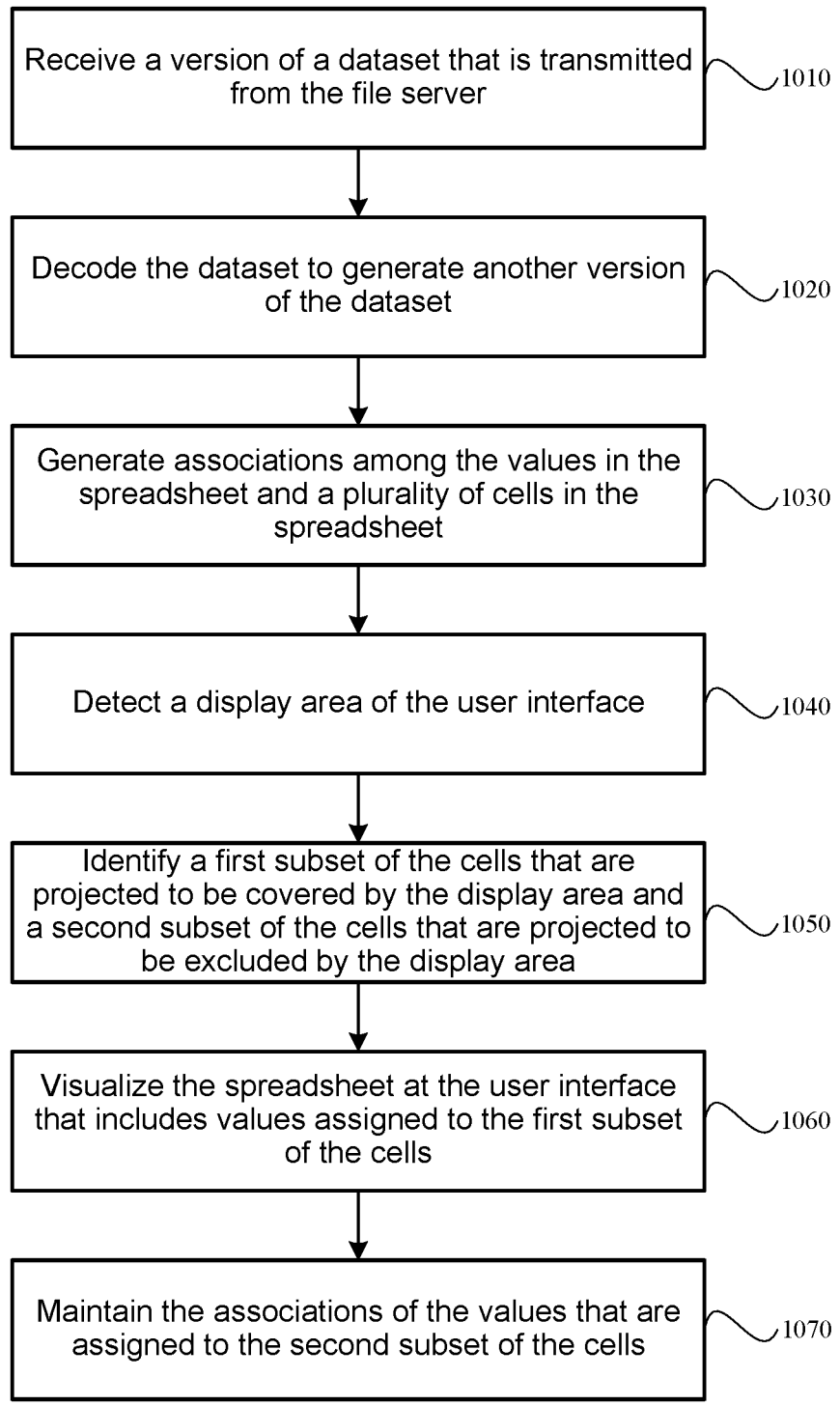
FIG. 10 is a flowchart depicting an example process that may be performed by a client device, in accordance with an embodiment.

FIG. 10 is a flowchart depicting an example process 1000 that may be performed by a client device 110, in accordance with an embodiment. The client device 110 may include an application 112 and a user interface 114. The steps in the process 1000 may be performed by the application 112, the user interface 114, and/or other components of the client device 110. The client device 110 may receive 1010 a version of a dataset that is transmitted from the file server 120. The dataset may include values of a spreadsheet file instance. The values may be generated by calculations performed by the file server 120 for the spreadsheet file instance. The dataset may be in a version that is efficient for transmission over the network 140. The client device 110 may decode 1020 the dataset to generate another version of the dataset. The decoded dataset may include the unprotected contents and the converted contents. The dataset may include one or more DOM elements. The client device 110 may generate 1030 associations among the values in the spreadsheet and a plurality of cells in the spreadsheet. For example, each value may be associated with one of the cells. The client device 110 may detect 1040 a display area of the user interface 114. The client device 110 may identify 1050 a first subset of the cells that are projected to be covered by the display area and a second subset of the cells that are projected to be excluded by the display area. The client device may visualize 1060 the spreadsheet at the user interface 114. The visualized spreadsheet displays at least a subset of the values. The subset of values may be values that are assigned to the first subset of the cells based on the associations. A cell in the visualized spreadsheet may the converted contents instead of the protected contents because the protected contents are normally not transmitted. The client device also may maintain 1070 the associations of the values that are assigned to the second subset of the cells.

Example Standard Dashboard

In some embodiments, the file server 120 may store various spreadsheets that are created by different sources. In some cases, those spreadsheets may have different looks and feel because the spreadsheets were originally generated by different creators. Those spreadsheets may describe similar models but have different arrangements of data. For example, FIG. 11A and FIG. 11B are conceptual diagrams illustrating two spreadsheets that have different looks, feels, and arrangements of data. The file server 120 stores a first spreadsheet having a first arrangement of data as shown in FIG. 11A. The first spreadsheet may correspond to a first model that has a first look and feel. A model may be a collection of rules that are used to analyze certain data. For example, a model may be a financial model that evaluates the value of an asset class. This is merely a non-limiting example of what a model is. In another case, a model may be a scientific model that simulates a certain environment. In a third case, a model may be an engineering model that attempts to optimize a set of conditions. The first spreadsheet includes a plurality of cells that may include the name of a field, a value for the field, and a formula that can be used to determine a value automatically.

FIG. 11B illustrates a second spreadsheet that is stored by the file server 120. The second spreadsheet has a second arrangement of data that is different from the first arrangement of data. The second spreadsheet may correspond to a second model that has a second look and feel. The second model may be another collection of rules that are used to analyze another set of data. In some embodiments, the first model in the first spreadsheet and the second model in the second spreadsheet may largely be used to model similar things. However, how the data are arranged and presented may be completely different between the two spreadsheets, potentially because the two spreadsheets are generated by two different creators. For example, a specific input "return rate" (an arbitrary example, not shown in figures) may be located in cell A2 of the first spreadsheet but the same type of input "return rate" may be located in cell C5 of the second spreadsheet.

The first spreadsheet may be uploaded by a first user to the file server 120 (e.g., a cloud server). The file server 120 stores the first spreadsheet. The second spreadsheet may be uploaded by a second user to the cloud server to store the second spreadsheet. The first and second spreadsheets may be accessible by a group of users that have an access privilege. For example, the group of users may be a corporate team that may access spreadsheets created by different team members.

FIG. 11C is a conceptual diagram illustrating an example graphical user interface (GUI) for a user to create and manage a mapping file that associates cells in a standard dashboard and one or more spreadsheets, in accordance with some embodiments. The file server 130 may store a standard dashboard that stores a first mapping to the first spreadsheet and a second mapping to the second spreadsheet. The standard dashboard is a third spreadsheet that may associate a set of dashboard cells in the standard dashboard to a first set of cells in the first spreadsheet according to the first mapping. The standard dashboard may associate the same set of dashboard cells in the standard dashboard to a second set of cells in the second spreadsheet according to the second mapping. For the purpose of quick reference, a cell in the standard dashboard may be referred to as a dashboard cell. FIG. 11C shows a first mapping file that includes one or more cell-to-cell mappings. Each cell-to-cell mapping associates a cell in the first spreadsheet to a dashboard cell in the standard dashboard. For example, the mapping may include the cell location in the standard dashboard and the cell location in the source cell. The mapping may also take the form of a formula. The formula automatically readjusts the cell in the mapping in the first spreadsheet in response to edit to the first spreadsheet. For example, if the mapping is defined by a formula, and a column is inserted in the first spreadsheet, the formula automatically locates the new source cell. The same type of adjustment may be used for the standard dashboard.

FIG. 11D is a conceptual diagram illustrating an example standard dashboard, in accordance with some embodiments. The standard dashboard is associated with a specific look and feel. The standard dashboard may be a templatization of spreadsheet models with a standardized set of inputs inserted. Values in the standard dashboard are filled based on whether the first spreadsheet or the second spreadsheet is selected. For example, the standard dashboard is associated with a standard format and a predefined arrangement of data. If the first spreadsheet is selected to generate the standard dashboard, the file server 120 will populate the cells in the standard dashboard based on the values in the first spreadsheet according to the mapping file. If the second spreadsheet is selected to generate the standard dashboard, the file server 120 will populate the dashboard cells based on the values in the second spreadsheet according to a second mapping file. As such, models that different looks, feels, and arrangements of data can be standardized using the mapping and the standard dashboard features. The mapping may be created and edited via a client portal by a user, as shown in FIG. 11C. Additional mappings for more spreadsheets may be added to the standard dashboard.

FIG. 11E is a conceptual diagram illustrating the functionality of the file server to provide sets of predetermined values to increase the speed of operation of the spreadsheet and adjustment, in accordance with an embodiment. The standard dashboard may be associated with a plurality of scenarios. Each scenario is a set of predetermined values for one or more dashboard cells. For example, a scenario may include rules that are related to a number of cells. The scenario includes predetermined values for those cells. A different scenario includes a different set of predetermined values for those cells. A user may use the GUI to switch between scenarios. Upon receiving a selection of a scenario, the file server 120 automatically populates the predetermined values to the cells specified in the scenario's rules. Hence, the operation of the GUI is streamlined and the user can quickly switch between different sets of data.

FIG. 11F is a conceptual diagram illustrating a GUI of the file server 120 that displays an analytical report that can be generated based on various spreadsheets with different arrangements of data, in accordance with some embodiments. The analytical report may be a templatization of spreadsheet models with a standardized set of outputs added. The file server 120 supports a standard analytical report to be generated from different spreadsheets that have different arrangements of data. As such, users from different portals may review a standard report even though the underlying spreadsheets may be different arrangements of data. In one embodiment, the file server 120 causes a first analytical report to be displayed at a first client portal in response to a first user selecting, at the first client portal, to generate the first analytical report. An example of the first analytical report is shown in FIG. 11F. The first analytical report is generated based on a common analytical report template that includes a metric calculated based on one or more cells in the set of dashboard cells. The metric may be an aggregated data that is calculated from a formula in the template based on values in the first spreadsheet. The first analytical report includes a first value of the metric calculated based on one or more cells in the first set of cells of the first spreadsheet that are mapped to the set of dashboard cells.

The file server 120 can also cause a second analytical report to be displayed at a second client portal in response to a second user selecting to generate, at the second client portal, to generate the second analytical report. The second analytical report can be generated also based on the same common analytical report template. The second analytical report has the format, fields, and metrics as the first analytical report. For example, FIG. 11F may also represent the second analytical report. The second analytical report includes a second value of the same metric calculated based on one or more cells in the second set of cells of the second spreadsheet that are mapped to the set of dashboard cells. Hence, even though the first and second spreadsheets have different arrangements of data, the same metric can be calculated through the mappings of the standard dashboard. A standardized analytic may be generated even though users are working on different spreadsheets in various formats.

The analytical report may also account for different scenarios. For example, the metric in the analytical report may be shown as having multiple values, each value corresponding to one of the scenarios. In FIG. 11F, the user has selected two scenarios "Base 400" and "Base Case 150." The first analytical report may include a first set of results that are generated from one or more scenarios selected by the first user. The first set of results are generated based on the predetermined values of the plurality of scenarios and the first arrangement of data in the first spreadsheet. The second analytical report includes a second set of results that are generated from one or more scenarios selected by the second user. The second set of results are generated based on the predetermined values of the plurality of scenarios and the second arrangement of data in the second spreadsheet.

Example Mapping Tests

In some embodiments, the file server 120 may run one or more mapping tests to check mapping and other quality issues of various standardized spreadsheets that are saved on the file server 120. A standardized spreadsheet may take the form of the standard dashboard, which has a standard set of inputs, or the analytical report which has a standard set of outputs. As mentioned in the discussion above, the file server 120 may deploy effectively, into a browser, spreadsheet functionality that is housed on the server side of the file server 120. The server-side spreadsheets may be optimized with respect to information transmission and browser navigation to make the complex server functionality available in the browser, which may have a more limited computation capability and speed. The browser allows administrators of the spreadsheet to manage version control and distribution of the spreadsheet to a curated audience without the disadvantages that may be associated with sending the actual file. For example, if the actual spreadsheet is sent, the process may risk the loss of Intellectual Property control, the lack of usage audit, and generate versioning risk. In some embodiments, some cells in the server-side spreadsheet may be marked as protected contents. In rendering the spreadsheet in a browser, the protected contents may be removed or be converted to a public version of the contents. The curated audience may be privileged to access many spreadsheets in a library that are similar but not identical in terms of format and functionality.

In some embodiments, the file server 120 manages the version control of spreadsheets via one or more mapping checks to ensure that new versions of models deployed from the server side conform to the same display requirements and functional consistency as previous versions. In this way, end users accessing the functionality via the browser will have the correct experience and usage of the spreadsheet functionality as intended by the administrator. The various versions of spreadsheets may include a first model that has a first arrangement of data, a second model that has a second arrangement of data, additional edits and versions of the first model or the second model, and standardized spreadsheets that may store various mapping with the first model and the second model.

The file server 120 allows creators and administrators of spreadsheets to map and apply consistent inputs and outputs across a library of similar but un-identical models stored on the server side of file server 120. This provides the benefits of templatization for the user on the browser side. For example, the file server 120, based on an administrator's inputs illustrated in FIG. 11C, may store a first mapping to a first spreadsheet that represents a first model. Likewise, the file server 120 may store a second mapping to the second spreadsheet that represents a second model. The standardized spreadsheet, which may be a standard dashboard or an analytical report, may be a third spreadsheet that associates a set of cells in the standardized spreadsheet to a first set of cells in the first spreadsheet according to the first mapping. The standardized spreadsheet may also associate the same set of cells in the standardized spreadsheet to a second set of cells in the second spreadsheet according to the second mapping. The standardized spreadsheet may be viewed by a curated audience that is granted the privilege to view the spreadsheet.

The content, such as the cell values, formulas, and cross-references, of the standardized spreadsheet is based on the mapping files. The file server 120 performs one or more mapping tests to determine whether the mapping is correct. The mapping tests may also be referred to as quality assurance tests for the deployment of server side spreadsheets into the browser environment to check if the audience reviewing the spreadsheet in the browser environment will be able to view the correct content. The mapping tests may also test whether protected contents are converted or removed in the browser version of the spreadsheet. The mapping tests may evaluate the mapping and quality of the spreadsheets for models, the standard dashboard, and/or the analytical report. The mapping tests may be performed in response to a manual request from a user (e.g., an administrator that creates the analytic report and the standard dashboard). The mapping tests may also be performed in response to edit to any of the spreadsheets.

In various embodiments, the file server 120 may conduct different kinds of mapping tests to determine whether the spreadsheets, including the standardized spreadsheet, include one or more informalities. The informalities may include errors in values or formulas, contents that are not supposed to be included, formatting issues, and other visual errors. While the term "mapping test" is used, the mapping test generally is a quality assurance test and is not limited to strictly examining the proper mapping between two spreadsheets. The mapping tests may include tests that scan for various types of informalities. The mapping tests may include a hash test, cell value comparison test, external reference test, analytical report test, and scenario comparison test. Upon running various tests, the file server 120 may generate a report for display at a user interface as a result of one or more mapping tests. FIG. 12 is an example of a mapping test report.

The hash test may run on any spreadsheet file. The spreadsheet file may be an original file that includes a model, the standard dashboard, or the analytical report. The software code of the hash test may cause a processor to read one or more cells in the server side file. The processor scans for each cell and provides a pass if no spreadsheet cell has a hash (error) value in the cell. The processor may identify a fail if any spreadsheet cell has a hash (error) value in the cell. If there are no hash values, this indicates the input sheet (e.g., the original file that includes a model) and the output sheet (e.g., the standardized spreadsheet) have integrated correctly or at least the two files do not fail to integrate in terms of hash errors. Hash errors in spreadsheets may indicate a formula failure. The hash test ensures no such fundamental formula failure has occurred on the server side before deployment into the browser.

The cell value comparison test reviews the cells found in the original spreadsheet such as a model and compares those cells to the corresponding cells in a standardized spreadsheet such as the standard dashboard to ensure that the cell values in both are the same. For example, a first cell in the first spreadsheet of the first model may be mapped to a dashboard cell in the standard dashboard. Both cells may be governed by formulas. If the mapping, formal, and data arrangement are correct, the formulas will result in the same values. In this way, the file server 120 ensures that the process of inserting standardized input tabs has not altered the functionality of the original spreadsheet. FIG. 12 is an example of the output report of a cell value comparison test.

The external reference test scans whether one or more cells include an external reference in any of the spreadsheets. For example, the code instructions review an original file (e.g., a file that corresponds to a model) to ensure that there are no external reference links that have been added to the file since the last version control version was deployed. If multiple users manipulate an original file, one of the users may insert one or more external links in the current version of the original file. The file server 120 performs the external reference test to ensure that the new file is consistent with previous files along the dimension of external link functionality. The test may be run on the server side file before deployment into the browser.

The file server 120 uses the analytical report test to review the correctness of the analytical report. An analytical report may be generated by an underlying model based on cell values in the model. The file server 120 may use a standardized output calculator to call values from an original file that includes a model. The analytical report uses a standard calculation framework. When the standard inputs subsequently are added to the standard dashboard, the file server 120 checks whether the output of the standard output calculator has not changed because of the newly implemented input changes to the file. The analytical report test checks whether the standard dashboard and a model generate the same resulting analytical report output by running the calculation from both the standard dashboard and a model and comparing the results.

The scenario comparison check reviews an original file that includes a model and an analytic report. The scenario comparison check changes values with respect to input cells in both spreadsheets. The file server 120 may checks values in the spreadsheets based on the predetermined values in one or more scenarios. With the change in input values based on a scenario, the scenario comparison check is run in a fashion similar to the value comparison test to make sure that the resulting values in the cells in two spreadsheets are similar. This test may capture errors that are not captured in the value comparison test because the value comparison test reviews a file that is static. Values in the value comparison test may match, but when input values change as a user selects a different scenario, the scenario comparison check may discover that a multiplier is different in the formulas of the two files, or the direction of an arithmetic sign is reversed. Such differences are captured by changing values and observing the differing results, but not by viewing a static file.

In some embodiments, the mapping tests may also include checking for protected content. For example, a first spreadsheet that represents a model may be private and includes a protected content. A spreadsheet being private refers to the spreadsheet being associated with a first level of access privilege that limits access to a certain group of user(s). The administrator of the spreadsheet, who has the access privilege, may generate a public publication or a spreadsheet that is associated with a second level of access privilege that allows more users to view the content of the spreadsheet. The administrator may intend to remove the protected content in the public version of the spreadsheet. The file server 120 may include a test that scans for whether the protected content is included in the public publication.

The mapping tests may also include an aggregation test that determines whether a value in a dashboard cell of the standardized spreadsheet is aggregated correctly. Details of the aggregation test are discussed in FIG. 8.

Computing Machine Architecture

FIG. 13 is a block diagram illustrating components of an example computing machine that is capable of reading instructions from a computer readable medium and execute them in a processor (or controller). A computer described herein may include a single computing machine shown in FIG. 13, a virtual machine, a distributed computing system that includes multiples nodes of computing machines shown in FIG. 13, or any other suitable arrangement of computing devices.

By way of example, FIG. 13 shows a diagrammatic representation of a computing machine in the example form of a computer system 1300 within which instructions 1324 (e.g., software, program code, or machine code), which may be stored in a computer readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 13 may correspond to any software, hardware, or combined components shown in FIGS. 1 and 2, including but not limited to, the client device 130, the file server 120, and various engines, interfaces, terminals, and machines shown in FIGS. 2 and 3. While FIG. 13 shows various hardware and software elements, each of the components described in FIGS. 1, 2, and 3 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1324 that specify actions to be taken by that machine. Further, while only a single machine is illustrated, the term "machine" and "computer" also may be taken to include any collection of machines that individually or jointly execute instructions 1324 to perform any one or more of the methodologies discussed herein.

The example computer system 1300 includes one or more processors 1302 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1300 also may include a memory 1304 that store computer code including instructions 1324 that may cause the processors 1302 to perform certain actions when the instructions are executed, directly or indirectly by the processors 1302. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 1302 and reduces the space required for the memory 1304. For example, the architecture and methods described herein reduces the complexity of the computation of the processors 1302 by applying one or more novel techniques that simplify the steps generating results of the processors 1302, particularly for a processor of a client device that generates a web browser. The algorithms described herein also reduce the size of the models and datasets to reduce the storage space requirement for memory 1304.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 1300 may include a main memory 1304, and a static memory 1306, which are configured to communicate with each other via a bus 1308. The computer system 1300 may further include a graphics display unit 1310 (e.g., a plasma display panel (PDP), a liquid crystal display (LCD), a projector, or a cathode ray tube (CRT)). The graphics display unit 1310, controlled by the processors 1302, displays a graphical user interface (GUI) to display one or more results and data generated by the processes described herein. The computer system 1300 also may include alphanumeric input device 1312 (e.g., a keyboard), a cursor control device 1314 (e.g., a mouse, a trackball, a joystick, a motion sensor, or other pointing instrument), a storage unit 1316 (a hard drive, a solid state drive, a hybrid drive, a memory disk, etc.), a signal generation device 1318 (e.g., a speaker), and a network interface device 1320, which also are configured to communicate via the bus 1308.

The storage unit 1316 includes a computer readable medium 1322 on which is stored instructions 1324 embodying any one or more of the methodologies or functions described herein. The instructions 1324 also may reside, completely or at least partially, within the main memory 1304 or within the processor 1302 (e.g., within a processor's cache memory) during execution thereof by the computer system 1300, the main memory 1304 and the processor 1302 also constituting computer readable media. The instructions 1324 may be transmitted or received over a network 1326 via the network interface device 1320.

While computer readable medium 1322 is shown in an example embodiment to be a single medium, the term "computer readable medium" should be taken to include a single medium or multiple media (e.g., a centralized or distributed database, or associated caches and servers) able to store instructions (e.g., instructions 1324). The computer readable medium may include any medium that is capable of storing instructions (e.g., instructions 1324) for execution by the processors (e.g., processors 1302) and that cause the processors to perform any one or more of the methodologies disclosed herein. The computer readable medium may include, but not be limited to, data repositories in the form of solid-state memories, optical media, and magnetic media. The computer readable medium does not include a transitory medium such as a propagating signal or a carrier wave.

Additional Considerations

Beneficially, the example systems and processes described herein overcome several obstacles in provisioning effectively in a browser environment. By maintaining the mapping of the values and the cells and encoding values in DOM elements while displaying a subset of values that are currently covered by the display area of the user interface, the application can support a spreadsheet with a large amount of data using a user interface that has a significantly lower processing power than the server. This allows user interfaces with lower processing power, such as web browsers, to be able to render a highly complex spreadsheet. The availability of content protection by converting protected contents to other values at the server-side before the dataset carrying the values of the spreadsheet is transmitted to the application also allows the owner of the spreadsheet to have the flexibility to hide or restrict confidential information in a collaborative environment.

Conventionally, spreadsheet load times at each new user-initiated session (e.g., multiple seconds depending on file size) are impracticably slow for delivery to browser usage. The file server 120 here maintain one or more spreadsheet file instances opened in a zero state. The potential spreadsheet functionality and capacity used by the file server 120 can be vastly larger than browser capacity. For example, browser capacity limits are typically estimated to about fewer than 5,000 DOM elements while a spreadsheet processed by the file server 120, in one embodiment, may be able to accommodate 20,000,000,000 DOM elements. The system 100 also reduces the transmission lags between a server and a client device for communicating a large quantity of data encompassed in complex spreadsheets. The system 100 solves these challenges with several components working together such that substantially the full power of spreadsheet functionality can be accessed by browser-based users at practical speeds via a process that imparts the benefits detailed above.

Conventionally, browser capabilities are overmatched by the typical complexity of large classes of spreadsheet models. One way to visualize the problem is to imagine a sheet of paper that may, for example, be 20 feet long by 6 feet high, and that represents the full size of a spreadsheet analytics tab (note that there might be 30 or more, or any number, of such worksheets in a single file). Such a configuration leads to challenges in visual rendering such as effectively displaying this large and dynamic landscape in small form factor displays (e.g., 11 to 17-inch diagonal displays with browser window sizes that are often smaller). Moreover, rendering such large spreadsheets can overpower a conventional browser, causing it to hang with every interaction. To accommodate massive spreadsheet content that may reach 20,000,000,000 DOM elements in a small browser vehicle that can handle perhaps only 5,000 DOM elements effectively, the virtualization engine 316 maintains the mapping of the values and cells while may transmit a subset of DOM elements that are projected to be in the display area to display in a user interface 114.

The disclosed configurations may be useful for finance but also have applications in many other fields. In the past, the monetary stakes in these markets have justified payment of high fees for dedicated special-purpose built systems like those of BLOOMBERG or INTEX. Additionally, large institutions have built their own in-house database-driven web applications that can sometimes be shared with third parties. These types of solutions are often more expensive and slower to implement than embodiments described herein. An embodiment may mirror the spreadsheet functionality, reducing coding translation error from what has already been built. The resulting approach is faster, and therefore cheaper, than coding an existing spreadsheet directly into a database application.

Also, an example embodiment may serve to create an effective and cheap method for displaying DOM elements to a browser or, in other words, for building a website. A user can use a spreadsheet to design and rapidly deploy a web-page, or set of related web-pages that interact together, using the functionality specified in a spreadsheet file. Users would be able to rapidly change or update the web page using the processes described herein. The functionality available in such a deployment could easily match and in many cases exceed that available through traditional web building tools. Spreadsheets include functionality to hyperlink among cells, which in embodiments described may be DOM elements. A user could therefore hyperlink between and among elements in a virtualization environment that was very large compared to the typical web page.

Moreover, there is no effective limit to the number of tabs a native spreadsheet file may have if it were housed in an environment with sufficient processing power to support it. Each worksheet in such a spreadsheet (or more precisely cells on different tabs) could also be connected with hyperlinks such that an entire family of web-pages would be designed and deployed within a single zero-state spreadsheet file in embodiments describe herein. Spreadsheets also have the capability to house graphical images, to undertake complex calculations, to provide conditional formatting depending on the state of the cell, or to perform any functions that are typically available within a web-enabled interface. For these reasons, the configuration serves not only to be an effective method for providing the benefits of a browser environment to those seeking spreadsheet functionality, but they also serve to make available the distinct benefits and strengths of spreadsheets to those constructing website applications for browser environments.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method comprising:
storing a first spreadsheet having a first arrangement of data;
storing a second spreadsheet having a second arrangement of data different from the first arrangement of data;
storing a standardized spreadsheet that stores a first mapping to the first spreadsheet and a second mapping to the second spreadsheet, the standardized spreadsheet being a third spreadsheet that (1) associates a set of cells in the standardized spreadsheet to a first set of cells in the first spreadsheet according to the first mapping and (2) associates the same set of cells in the standardized spreadsheet to a second set of cells in the second spreadsheet according to the second mapping, wherein the first spreadsheet includes a protected content;
performing one or more mapping tests on the standardized spreadsheet to determine whether the standardized spreadsheet includes one or more informalities;
generating a public publication that removes the protected content, wherein the one or more mapping tests comprises a test that scans for whether the protected content is included in the public publication; and
generating a report for display at a user interface for a result of the one or more mapping tests.

2. The computer-implemented method of claim 1, wherein the one or more mapping tests comprises a hash error check that determines whether there is a formula failure in the standardized spreadsheet.

3. The computer-implemented method of claim 1, wherein the one or more mapping tests comprises a cell value comparison test that compares a first value in a first cell in the first spreadsheet to a value in a cell of the standardized spreadsheet, the first cell and the cell of the standardized spreadsheet are associated according to the first mapping.

4. The computer-implemented method of claim 1, wherein the one or more mapping tests comprises an external reference check that scans one or more external references in the first spreadsheet.

5. The computer-implemented method of claim 1, wherein the one or more mapping tests comprises an aggregation test that determines whether a value in a dashboard cell of the standardized spreadsheet is aggregated correctly.

6. The computer-implemented method of claim 1, wherein the one or more mapping tests comprises an analytical report test and a scenario comparison check.

7. The computer-implemented method of claim 1, wherein the one or more mapping tests are performed responsive to an edit to the first spreadsheet or the second spreadsheet.

8. A system comprising:
one or more processors; and
memory coupled to the one or more processors, the memory storing computer code comprising instructions, the instructions, when executed by the one or more processors, cause the one or more processors to:
store a first spreadsheet having a first arrangement of data;
store a second spreadsheet having a second arrangement of data different from the first arrangement of data;
store a standardized spreadsheet that stores a first mapping to the first spreadsheet and a second mapping to the second spreadsheet, the standardized spreadsheet being a third spreadsheet that (1) associates a set of cells in the standardized spreadsheet to a first set of cells in the first spreadsheet according to the first mapping and (2) associates the same set of cells in the standardized spreadsheet to a second set of cells in the second spreadsheet according to the second mapping wherein the first spreadsheet includes a protected content;
perform one or more mapping tests on the standardized spreadsheet to determine whether the standardized spreadsheet includes one or more informalities;
generate a public publication that removes the protected content, wherein the one or more mapping tests comprises a test that scans for whether the protected content is included in the public publication; and
generate a report for display at a user interface for a result of the one or more mapping tests.

9. The system of claim 8, wherein the one or more mapping tests comprises a hash error check that determines whether there is a formula failure in the standardized spreadsheet.

10. The system of claim 8, wherein the one or more mapping tests comprises a cell value comparison test that compares a first value in a first cell in the first spreadsheet to a value in a cell of the standardized spreadsheet, the first cell and the cell of the standardized spreadsheet are associated according to the first mapping.

11. The system of claim 8, wherein the one or more mapping tests comprises an external reference check that scans one or more external references in the first spreadsheet.

12. The system of claim 8, wherein the one or more mapping tests comprises an aggregation test that determines whether a value in a dashboard cell of the standardized spreadsheet is aggregated correctly.

13. The system of claim 8, wherein the one or more mapping tests comprises an analytical report test and a scenario comparison check.

14. The system of claim 8, wherein the one or more mapping tests are performed responsive to an edit to the first spreadsheet or the second spreadsheet.

15. A non-transitory computer-readable medium configured to store computer code comprising instructions, the instructions, when executed by one or more processors, cause the one or more processors to:
    store a first spreadsheet having a first arrangement of data;
    store a second spreadsheet having a second arrangement of data different from the first arrangement of data;
    store a standardized spreadsheet that stores a first mapping to the first spreadsheet and a second mapping to the second spreadsheet, the standardized spreadsheet being a third spreadsheet that (1) associates a set of cells in the standardized spreadsheet to a first set of cells in the first spreadsheet according to the first mapping and (2) associates the same set of cells in the standardized spreadsheet to a second set of cells in the second spreadsheet according to the second mapping, wherein the first spreadsheet includes a protected content;
    perform one or more mapping tests on the standardized spreadsheet to determine whether the standardized spreadsheet includes one or more informalities;
    generate a public publication that removes the protected content, wherein the one or more mapping tests comprises a test that scans for whether the protected content is included in the public publication; and
    generate a report for display at a user interface for a result of the one or more mapping tests.

16. The non-transitory computer-readable medium of claim 15, wherein the one or more mapping tests comprises a hash error check that determines whether there is a formula failure in the standardized spreadsheet.

17. The non-transitory computer-readable medium of claim 15, wherein the one or more mapping tests comprises a cell value comparison test that compares a first value in a first cell in the first spreadsheet to a value in a cell of the standardized spreadsheet, the first cell and the cell of the standardized spreadsheet are associated according to the first mapping.

18. The non-transitory computer-readable medium of claim 15, wherein the one or more mapping tests comprises an external reference check that scans one or more external references in the first spreadsheet.

19. The non-transitory computer-readable medium of claim 15, wherein the one or more mapping tests comprises an aggregation test that determines whether a value in a dashboard cell of the standardized spreadsheet is aggregated correctly.

20. The non-transitory computer-readable medium of claim 15, wherein the one or more mapping tests comprises an analytical report test and a scenario comparison check.

* * * * *